(12) United States Patent
Gotou

(10) Patent No.: US 11,235,609 B2
(45) Date of Patent: Feb. 1, 2022

(54) METHOD FOR PRINTING AND PRINTER

(71) Applicant: RICOH COMPANY, LTD., Tokyo (JP)

(72) Inventor: Hiroshi Gotou, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/888,133

(22) Filed: May 29, 2020

(65) Prior Publication Data

US 2020/0391533 A1  Dec. 17, 2020

(30) Foreign Application Priority Data

Jun. 11, 2019 (JP) .............................. JP2019-108942

(51) Int. Cl.
  *B41M 5/00* (2006.01)
  *C09D 11/54* (2014.01)
  *B41J 2/21* (2006.01)

(52) U.S. Cl.
  CPC .......... *B41M 5/0011* (2013.01); *B41J 2/2107* (2013.01); *B41J 2/2114* (2013.01); *C09D 11/54* (2013.01)

(58) Field of Classification Search
  CPC ... C09D 11/107; C09D 11/322; C09D 11/101; C09D 11/326; C09D 11/38; C09D 11/36;
  (Continued)

(56) References Cited

U.S. PATENT DOCUMENTS

2013/0176369 A1\* 7/2013 Gotou ................... B41J 2/2107
                                                                   347/100
2014/0002539 A1   1/2014 Gotoh et al.
(Continued)

FOREIGN PATENT DOCUMENTS

JP  2000-053897  2/2000
JP  2001-139849  5/2001
(Continued)

OTHER PUBLICATIONS

U.S. Appl. No. 16/751,267, filed Jan. 24, 2020 Hiroshi Gotou, et al.

*Primary Examiner* — Manish S Shah
(74) *Attorney, Agent, or Firm* — Grüneberg and Myers PLLC

(57) ABSTRACT

A method for printing is provided including: applying a pretreatment liquid containing a compound that aggregates an anionic compound on a print medium, and applying an ink containing water, an organic solvent, and a resin particle on the print medium to which the pretreatment liquid has been applied. The resin particle includes a polyurethane resin particle. The ink contains a cyclic ester having a structure represented by the following general formula (I). After the ink is left to stand and stored under a room temperature environment (25±5° C.) for a month, a rate of content of crystals of the cyclic ester having a particle diameter of 1 μm or larger in the ink is lower than 4 ppm.

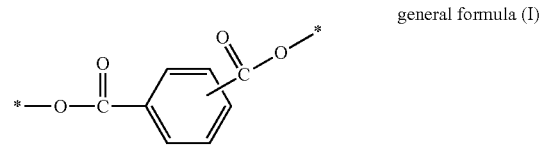

general formula (I)

17 Claims, 2 Drawing Sheets

(58) Field of Classification Search
CPC ......... C09D 11/40; C09D 11/30; C09D 11/32; C09D 11/324; C09D 11/328; C09D 11/102; C09D 11/005; C09D 11/54; C09D 11/52; C09D 11/106; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 3/11; C08K 2003/2237
See application file for complete search history.

(56) References Cited

U.S. PATENT DOCUMENTS

| | | | |
|---|---|---|---|
| 2014/0204156 A1* | 7/2014 | Gotou | B41J 2/01 347/100 |
| 2015/0035896 A1* | 2/2015 | Gotou | B41J 2/01 347/20 |
| 2015/0103116 A1* | 4/2015 | Gotou | B41J 2/2114 347/21 |

FOREIGN PATENT DOCUMENTS

| | | |
|---|---|---|
| JP | 2012-207202 | 10/2012 |
| JP | 2012-241135 | 12/2012 |
| JP | 2014-094998 | 5/2014 |
| JP | 2016-203470 | 12/2016 |
| JP | 2019-111763 | 7/2019 |

* cited by examiner

METHOD FOR PRINTING AND PRINTER

CROSS-REFERENCE TO RELATED APPLICATIONS

This patent application is based on and claims priority pursuant to 35 U.S.C. § 119(a) to Japanese Patent Application No. 2019-108942, filed on Jun. 11, 2019, in the Japan Patent Office, the entire disclosure of which is incorporated by reference herein.

BACKGROUND

Technical Field

The present disclosure relates to a method for printing and a printer.

Description of the Related Art

Inkjet recording methods have rapidly spread in recent years because of ease in recording color images, low running costs, or the like. However, these methods have disadvantages that image defects typified by blur of characters tend to occur depending on a combination of an ink and a recording medium, and image quality is greatly deteriorated.

For example, impermeable media for signages and the like have disadvantages that images remarkably blur and do not fix because of no ink absorption.

In addition, when an image is recorded on a coated paper for commercial printing or publication printing containing a filler such as calcium carbonate and kaolin as a coat layer material, the image remarkably blurs, or gradation is not generated.

Thus, for the purpose of improving drying property and fixity, a hydrophobic organic solvent, e.g. an organic solvent having an solubility parameter (SP) value of 8.9 to 12.0, or a high vapor pressure organic solvent has been used as an organic solvent, and furthermore an ink composition has shifted to a composition in which more water-dispersible resin particles are used.

In addition, since the impermeable media for signages are poor in ink fixity, a water-dispersible resin particle material is selected, or an addition amount of the water-dispersible resin particles is increased. In particular, to improve the fixity of the ink to an impermeable medium film, cases using a large amount of polyurethane resin particles synthesized from a polyol raw material containing an aromatic ring have been increasing.

Although image quality is improved because of the aforementioned change in situation, disadvantages are caused in ink storage stability, liquid permeability, and discharge stability.

SUMMARY

In accordance with some embodiments of the present invention, a method for printing is provided. The method for printing includes:
applying a pretreatment liquid containing a compound that aggregates an anionic compound on a print medium, and
applying an ink containing water, an organic solvent, and a resin particle on the print medium to which the pretreatment liquid has been applied.

The resin particle includes a polyurethane resin particle. The ink contains a cyclic ester having a structure represented by the following general formula (I). After the ink is left to stand and stored under a room temperature environment (25±5° C.) for a month, a rate of content of crystals of the cyclic ester having a particle diameter of 1 μm or larger in the ink is lower than 4 ppm.

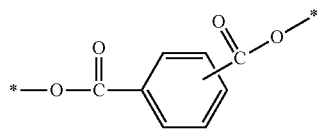

general formula (I)

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
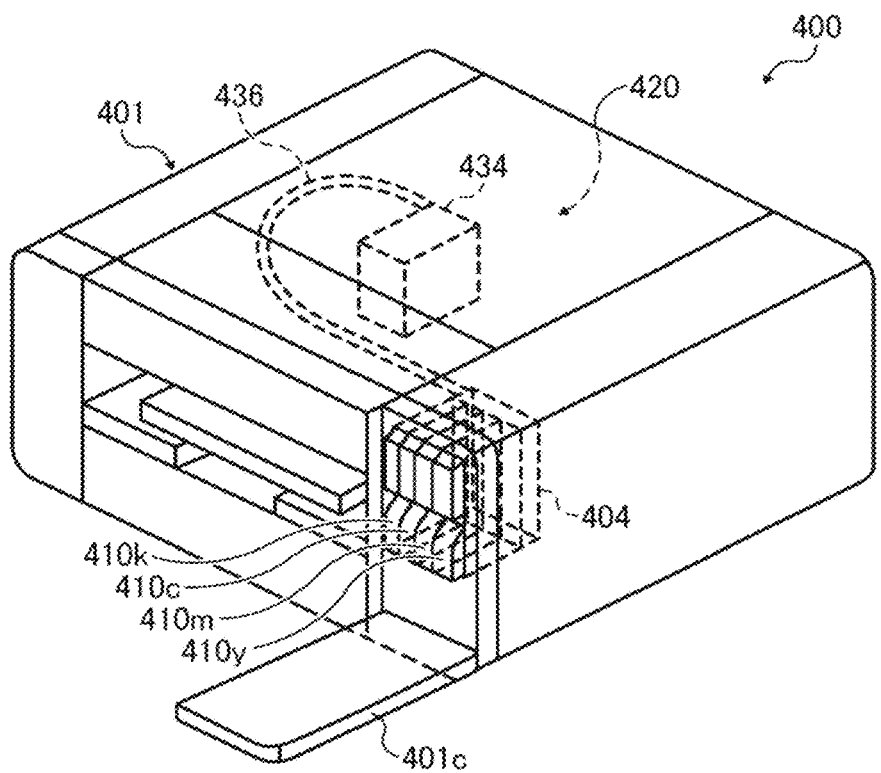
FIG. 1 is a diagram illustrating a recording apparatus using an ink according to an embodiment of the present invention.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

In accordance with some embodiments of the present invention, a method for printing is provided. The method provides high fixity and drying property, a print image quality with small blur on color boundary and small color unevenness, and excellent liquid permeability and discharge stability.

The method for printing according to an embodiment of the present invention includes a pretreatment liquid applying step of applying a pretreatment liquid on a print medium, and an ink applying step of applying an ink on the print medium to which the pretreatment liquid has been applied, and optionally a heat-drying step of drying the print medium to which the ink has been applied by heating.

The pretreatment liquid contains a compound that aggregates an anionic compound.

The ink contains a cyclic ester having a structure represented by the following general formula (I). The ink is such an ink that, after being left to stand and stored under a room temperature environment (25±5° C.) for a month, a rate of content of crystals of the cyclic ester having particle diameters of 1 μm or larger in the ink is lower than 4 ppm.

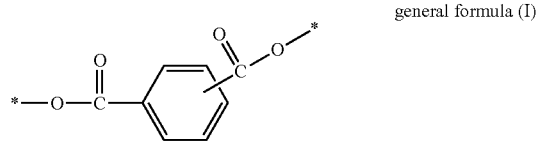

general formula (I)

Herein, the rate of content of crystals in the ink being lower than 4 ppm means that a rate of content of crystals in the ink is lower than 0.0004% by mass.

In addition, being left to stand and stored means storage without intentional vibration.

Pretreatment Liquid Applying Step
Pretreatment Liquid

The pretreatment liquid for treating a surface of a print medium in the present disclosure includes at least a compound capable of aggregating an anionic compound (e.g. water-dispersible particles of a resin and a colorant) contained in the ink.

The compound capable of aggregating the anionic compound such as water-dispersible particles is a cationic compound. Particularly preferable examples of the cationic compound include, but are not limited to, an inorganic metal salt, an organic acid metal salt, and an organic acid ammonium salt, each of which is soluble in water.

The use of the inorganic metal salt, the organic acid metal salt, and the organic acid ammonium salt for the pretreatment liquid makes it possible to obtain a print image quality with small color blur (color bleed), small color unevenness (beading), and small character paint-out, by the effect of aggregating pigment particles and resin particles contained in the ink.

Furthermore, in consideration of adhesiveness between the print medium and the ink, the pretreatment liquid preferably contains resin particles. Since the resin particles coexist with the cationic compound, the resin particles are preferably nonionic resin particles. For maintaining storage stability of the resin particles in coexistence with the cationic compound for an extended period of time, the resin particles are preferably not in a form of a commonly-used electric charge repulsion-type emulsion but in a form of nonionic resin particles dispersed by steric hindrance.

Among the electric charge repulsion types, anionic resin particles have been proven to aggregate when mixed with an inorganic metal salt. In particular, among inorganic metal salts, a polyvalent metal salt that generates trivalent cations by dissociation has been proven to instantaneously aggregate. The higher a valence value of a cation is, the faster and the more aggregation is promoted, and the higher the effect of salting out the dispersion is.

It has been found that cationic resin particles are sufficiently stable when left to stand at room temperature, but show increased viscosity when left to stand under warming as an acceleration test in anticipation of long-term stability.

When the nonionic resin particle comprises at least one selected from a polyolefin resin, a polyvinyl acetate resin, a polyvinyl chloride resin, a styrene-butadiene resin, and a copolymer of any of these resins, the nonionic resin particle exhibits strong adherence to a substrate, which is preferable.

When each of the inorganic metal salt, the organic acid metal salt, and the organic acid ammonium salt is at least one selected from calcium salt, magnesium salt, nickel salt, and aluminum salt, the effect of aggregating the water-dispersible particles are particularly excellent. Therefore, a print image quality with small color blur (color bleed), small color unevenness (beading), and small character paint-out can be obtained by the effect of aggregating the pigment particles and resin particles contained in the ink. Also, from the viewpoint of excellent storage stability, calcium salt, magnesium salt, nickel salt, and aluminum salt are preferable.

Examples of the inorganic metal salt compound include, but are not limited to, magnesium sulfate, aluminum sulfate, manganese sulfate, nickel sulfate, iron sulfate (11), copper sulfate (II), zinc sulfate, iron nitrate (II), iron nitrate (III), cobalt nitrate, strontium nitrate, copper nitrate (II), nickel nitrate (II), lead nitrate (II), manganese nitrate (II), nickel chloride (II), calcium chloride, tin chloride (II), strontium chloride, barium chloride, and magnesium chloride. Examples of water-soluble monovalent alkali metal salt compounds include, but are not limited to, sodium sulfate, potassium sulfate, lithium sulfate, sodium hydrogen sulfate, potassium hydrogen sulfate, sodium nitrate, potassium nitrate, sodium carbonate, potassium carbonate, sodium hydrogen carbonate, potassium hydrogen carbonate, sodium chloride, and potassium chloride.

Examples of the organic acid salt compound include, but are not limited to, sodium L-aspartate, magnesium L-aspartate, calcium ascorbate, sodium L-ascorbate, sodium succinate, disodium succinate, diammonium succinate, aluminum citrate, potassium citrate, calcium citrate, triammonium citrate, tripotassium citrate, trisodium citrate, diammonium citrate, disodium citrate, zinc lactate, aluminum lactate, ammonium lactate, potassium lactate, calcium lactate, sodium lactate, magnesium lactate, calcium acetate, potassium tartrate, calcium tartrate, sodium DL-tartrate, and sodium potassium tartrate.

Examples of the organic acid ammonium salt include, but are not limited to, ammonium acetate, ammonium propionate, ammonium lactate, ammonium oxalate, ammonium tartrate, ammonium succinate (diammonium succinate), diammonium malonate, diammonium hydrogen citrate, triammonium citrate, and ammonium L-glutamate.

A proportion of the inorganic metal salt, organic acid metal salt, or organic acid ammonium salt in the pretreatment liquid is preferably 0.1 to 30% by mass, more preferably 1 to 20% by mass. When the proportion is more than 30% by mass, the organic acid salt compound may be precipitated without being sufficiently dissolved, and when the proportion is less than 0.1% by mass, the effect of improving the print image quality may be lowered.

Nonionic Resin Particle

It is preferable that the nonionic resin particle have a glass transition temperature (Tg) of −30 to 30° C. to have moderate flexibility, leading to an excellent balance between laminate strength and rubfastness.

The nonionic resin particle refers to a resin particle that can be dispersed without using charges.

The nonionic resin particle refers to a resin fine particle, from solid contents of which isolated from a liquid composition by centrifugation, monomers having an acidic functional group such as a carboxyl group and a sulfo group, or a basic functional group such as an amino group are not detected by a pyrolysis gas chromatography-mass spectrometry (GC-MS) (e.g. GC-17A manufactured by Shimadzu Corporation).

The resin particle is not particularly limited in chemical structure, and any nonionic-dispersible resin particle can be used. However, it is preferable that the resin particle comprise at least one selected from a polyolefin resin, a chlorinated polyolefin resin, a polyvinyl acetate resin, a polyvinyl chloride resin, a polyester resin, a polyurethane resin, an acrylic resin, a styrene-butadiene resin, and a copolymer of any of these resins, for achieving strong adherence to various substrates. Furthermore, it is more preferable that the resin particle comprise an ethylene-vinyl acetate copolymer resin, an ethylene-vinyl acetate-vinyl chloride copolymer resin, or a chlorinated olefin resin.

The glass transition temperature Tg of the nonionic resin particle is preferably −30 to 30° C., more preferably −25 to 25° C.

When the Tg is −30° C. or higher, the resulting resin film is sufficiently tough and the pretreatment layer is more robust. When the Tg is 30° C. or lower, resin film formability is improved and also sufficient flexibility is secured, and therefore adherence to the substrate is strengthened. Thus, the Tg of −30 to 30° C. is preferable.

A proportion of the nonionic resin particle in the pretreatment liquid is preferably 0.5% by mass or more and 20% by mass or less in terms of a solid content.

When the proportion is 0.5% by mass or more, the resin can sufficiently coat the substrate, so that the adherence to the substrate is improved. When the proportion is 20% by mass or less, the resulting film thickness is not too increased, and the adherence is not likely to decrease.

A medium for the pretreatment liquid according to an embodiment of the present is a water-based medium, which may optionally contain a substance other than water. Examples of such a substance include, but are not limited to, a water-soluble organic solvent, a surfactant, and other trace additives.

Organic Solvent

The organic solvent used for the pretreatment liquid in the present disclosure is not particularly limited, and a water-soluble organic solvent can be used. Examples of the water-soluble organic solvent include, but are not limited to: a polyhydric alcohol; an ether such as a polyhydric alcohol alkyl ether and a polyhydric alcohol aryl ether; a nitrogen-containing heterocyclic compound; an amide; an amine; and a sulfur-containing compound.

Specific examples of the water-soluble organic solvent include, but are not limited to: a polyhydric alcohol such as ethyleneglycol, diethyleneglycol, 1,2-propanediol, 1,3-propanediol, 1,2-butanediol, 1,3-butanediol, 1,4-butanediol, 2,3-butanediol, 3-methyl-1,3-butanediol, triethyleneglycol, polyethyleneglycol, polypropyleneglycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerol, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; a polyhydric alcohol alkylether such as ethyleneglycol monoethyl ether, ethyleneglycol monobutyl ether, diethyleneglycol monomethyl ether, diethyleneglycol monoethyl ether, diethyleneglycol monobutyl ether, tetraethyleneglycol monomethyl ether, and propyleneglycol monoethyl ether; a polyhydric alcohol aryl ether such as ethyleneglycol monophenyl ether and ethyleneglycol monobenzyl ether; a nitrogen-containing heterocyclic compound such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; an amide such as formamide, N-methylformamide, N,N-dimethylformamide, 3-methoxy-N,N-dimethylpropionamide, and 3-butoxy-N,N-dimethylpropionamide; an amine such as monoethanolamine, diethanolamine, and triethylamine; a sulfur-containing compound such as dimethylsulfoxide, sulfolane, and thiodiethanol; propylene carbonate; and ethylene carbonate.

It is preferable to use an organic solvent having a boiling point of 250° C. or lower, because such an organic solvent not only functions as a wetting agent but also provides a good drying property.

A proportion of the organic solvent in the pretreatment liquid is not particularly limited, and can be appropriately selected depending on an intended purpose. However, the proportion is preferably 5% by mass or more and 60% by mass or less, more preferably 10% by mass or more and 30% by mass or less, even more preferably 10% by mass or more and 25% by mass or less, for drying property and discharge reliability of the pretreatment liquid.

In addition, it is preferable that the pretreatment liquid contain any of 1,2-propane diol, 1,3-butane diol, and 1,2-butane diol as an organic solvent, because the resin film formability is improved, and further the rubfastness is improved.

Surfactant

As the surfactant used for the pretreatment liquid, any of a silicone-based surfactant, a fluorine-based surfactant, an amphoteric surfactant, a nonionic surfactant, and an anionic surfactant can be used.

The silicone-based surfactant is not particularly limited and can be appropriately selected depending on an intended purpose.

Above all, a silicone-based surfactant that is not decomposed even at a high pH is preferable, and examples thereof include, but are not limited to, a side chain-modified polydimethylsiloxane, a both end-modified polydimethylsiloxane, a one end-modified polydimethylsiloxane, and a side chain both end-modified polydimethylsiloxane. A modified group having a polyoxyethylene group or a polyoxyethylenepolyoxypropylene group is particularly preferable because of suitable characteristics as an aqueous surfactant. In addition, as the silicone-based surfactant, a polyether-modified silicone-based surfactant can also be used, and examples of the silicone-based surfactant includes, but are not limited to, a compound in which a polyalkylene oxide structure is introduced into an Si side chain of dimethylsiloxane.

As the fluorine-based surfactant, e.g. a perfluoroalkylsulfonic acid compound, a perfluoroalkyl carboxylic acid compound, a perfluoroalkyl phosphate compound, and a polyoxyalkylene ether polymer compound having a perfluoroalkyl ethyleneoxide additive and a perfluoroalkyl ether group at side chains are particularly preferable because of low foamability.

Examples of the perfluoroalkylsulfonic acid compound include, but are not limited to, a perfluoroalkylsulfonic acid, and perfluoroalkylsulfonate. Examples of the perfluoroalkylcarboxylic acid compound include, but are not limited to, a perfluoroalkylcarboxylic acid, and a perfluoroalkylcarboxylate. Examples of the polyoxyalkylene ether polymer compound having the perfluoroalkyl ether group at a side chain include, but are not limited to, a sulfate ester salt of polyoxyalkylene ether polymer having a perfluoroalkyl ether group at a side chain, and a salt of polyoxyalkylene ether polymer having a perfluoroalkyl ether group at a side chain. Examples of a counter ion of the salts in these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Examples of the amphoteric surfactant include, but are not limited to, lauryl aminopropionate, lauryl dimethyl betaine, stearyl dimethyl betaine, and lauryl dihydroxyethyl betaine.

Examples of the nonionic surfactant include, but are not limited to, polyoxyethylenealkylphenyl ether, polyoxyethylenealkyl ester, polyoxyethylenealkylamine, polyoxyethylenealkylamide, polyoxyethylenepropylene block polymer, sorbitan fatty acid ester, polyoxyethylene sorbitan fatty acid ester, and ethylene oxide-added acetylene alcohol.

Examples of the anionic surfactant include, but are not limited to, polyoxyethylenealkyl ether acetate, dodecylbenzene sulfonate, laurate, and salt of polyoxyethylenealkyl ether sulfate.

These surfactants may be used alone or in combination.

Examples of the other trace additives include, but are not limited to, an antifoaming agent, an antiseptic and antifungal agent, and an antirust agent.

Antifoaming Agent

The antifoaming agent used for the pretreatment liquid is not particularly limited. Examples of the antifoaming agent include, but are not limited to, a silicone-based antifoaming agent, a polyether-based antifoaming agent, and a fatty acid ester-based antifoaming agent. These antifoaming agents may be used alone or in combination. Above all, the silicone-based antifoaming agent is preferable for excellent foam breaking effect.

Antiseptic and Antifungal Agent

The antiseptic and antifungal agent used for the pretreatment liquid is not particularly limited. Examples of the antiseptic and antifungal agent include, but are not limited to, 1,2-benzisothiazolin-3-one.

Antirust Agent

The antirust agent used for the pretreatment liquid is not particularly limited, and examples of the antirust agent include, but are not limited to, 1,2,3-benzotriazole, acidic sulfite, and sodium thiosulfate.

Pretreatment Liquid Applying Method

In the pretreatment liquid applying step in the method for printing according to this embodiment, the pretreatment liquid may be uniformly applied to the surface of the print medium using a discharge head.

Alternatively, the pretreatment liquid can be uniformly applied by any method for coating a surface of a print medium uniformly with the pretreatment liquid. The method for coating is not particularly limited.

Examples of the method for coating include, but are not limited to, a blade coating method, a gravure coating method, gravure-offset coating method, a bar coating method, a roll coating method, a knife coating method, an air knife coating method, a comma coater coating method, a u-comma coater coating method, an AKKU coating method, a smoothing coating method, a microgravure coating method, a reverse roll coating method, a 4 or 5-roll coating method, a dip coating method, a curtain coating method, a slide coating method, and a die coating method.

This pretreatment liquid applying step is effective either for a print medium whose surface has been sufficiently dried or a print medium under drying. Incidentally, a drying step of drying the print medium to which the pretreatment liquid has been applied can be optionally provided. In this case, the print medium can be dried using a roll heater, a drum heater, or warm air.

In the pretreatment liquid applying step, an amount of the pretreatment liquid in a wet state adhering to the print medium is within a range of preferably 0.1 to 30.0 $g/m^2$, more preferably 0.2 to 10.0 $g/m^2$. When the adhesion amount is as low as less than 0.1 $g/m^2$ an image quality (image density, chroma, beading, and color bleed) is hardly improved in some cases. When the adhesion amount is more than 30.0 $g/m^2$, the drying property of the pretreatment liquid is deteriorated, and fixing failure such as blocking is caused in some cases.

Ink Applying Step

Ink

Since impermeable media for signages are poor in ink fixity, a water-dispersible resin particle material is selected, or an addition amount of the water-dispersible resin particle material is increased. Furthermore, to improve the fixity of the ink to an impermeable medium film, cases using a large amount of polyurethane resin particles synthesized from a polyol raw material containing an aromatic ring, having a structure represented by the following general formula (I), have been increasing.

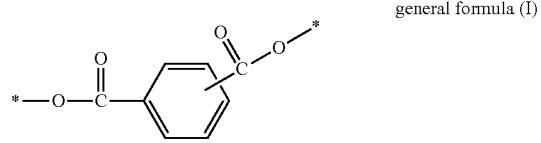

general formula (I)

However, the polyol raw material containing an aromatic ring, having the structure represented by the general formula (I), contains a cyclic ester having the structure represented by general formula (I) as a by-product which is hard to dissolve in water and a water-soluble solvent. Since the cyclic ester is contained in the high-viscosity polyol, the polyurethane resin particles are produced with the cyclic ester remaining unremoved.

When producing an ink composition using the polyurethane resin particles, and leaving and storing the ink composition in an ink pack at room temperature (25±5° C.) for a month or longer, a cyclic ester compound having the structure represented by general formula (I) is eluted from the polyurethane resin particles, and cyclic ester crystals having the structure represented by general formula (I) are precipitated in the ink composition. It has been found that the precipitation of the cyclic ester compound crystals in the ink deteriorates liquid permeability and furthermore destabilizes discharge.

The cyclic ester having the structure represented by general formula (I) contained in the ink is supposed to contain raw materials used for producing the polyurethane resin and/or by-products of the raw materials. Examples of such cyclic ester include, but are not limited to, a cyclic ester represented by the following structural formula A.

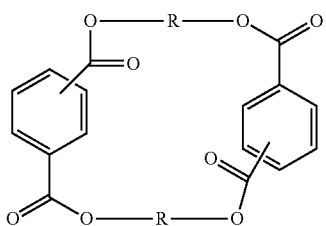

structural formula A where R represents an alkylene, which normally has 3 to 10 carbon atoms.

Raw materials and by-products that have not been removed in a purification stage or an ink production stage remain contained in the ink. It has been found that the cyclic ester having the structure represented by general formula (I) crystallizes in the ink with time. The inventors of the present invention have found that an object of the present invention is achieved when a rate of content of the cyclic ester crystals having the structure represented by general formula (I) in the ink is lower than 4 ppm.

The cyclic ester having the structure represented by general formula (I) is normally water-insoluble. Even in a case in which the cyclic ester having the structure represented by general formula (I) is not detected in the water content of the aqueous dispersion of the polyurethane resin particle, when the ink is produced by mixing the aqueous dispersion of the polyurethane resin particle and other components such as an organic solvent, the cyclic ester crystals having the structure represented by general formula (I) may be precipitated in the ink. It is presumed that this is because the cyclic ester having the structure represented by general formula (I) contained in the polyurethane resin particles gets eluted and crystallized when being mixed with the organic solvent.

A rate of content of those having a molecular weight of less than 1,000, among the cyclic esters having the structure represented by general formula (I), in the ink is not particularly limited, but is preferably 50 ppm or lower for suppressing crystallization.

It has been found that, when the ink is left to stand and stored at room temperature (25±5° C.) for a month or longer, if a rate of content of the cyclic ester crystals having particle diameters of 1 μm or larger in the ink is 4 ppm or higher, liquid permeability becomes practically problematic, resulting in discharge failure. Also, it has been confirmed that there is no practical problem as long as the rate of content of the cyclic ester crystals in the ink is lower than 4 ppm.

Furthermore, when the ink composition containing the cyclic ester compound having a structure represented by general formula (I) is warmed at 40° C. or higher and lower than 70° C. for 6 hours or longer, the amount of the precipitated cyclic ester crystals is decreased. Also, it has been found that the cyclic ester crystals having been precipitated in the ink composition disappear.

However, a mechanism of decrease in the amount of the precipitated cyclic ester crystals, and a mechanism of disappearance of the cyclic ester crystals are unclear. In the case of warming at 40° C., warming at 40° C. for 2 weeks or longer decreases the precipitated cyclic ester crystals. Additionally, in the case of warming at 68° C., warming at 68° C. for 6 hours eliminates precipitation of cyclic ester crystals, and also extinguishes the cyclic ester crystals precipitated in the ink.

In the case of warming at 40° C., the warming time is preferably 2 weeks to 1 month, and in the case of warming at 68° C., the warming time is preferably 6 hours to 12 hours.

Warming at lower than 40° C. exhibits no effect of decreasing the precipitated cyclic ester crystals. In addition, warming at 70° C. or higher may change physical properties of the ink or cause separation of the ink liquid.

Particularly preferably, storage while warming at 55 to 65° C. for 12 to 24 hours exhibits a high effect with small ink damage.

In the present disclosure, the precipitated crystals are filtered using a filter paper having a particle holding capacity of 1 μm (e.g. Filter Paper for KIRIYAMA ROHTO No. 5C), then a mass of the filter paper before filtration, and a total mass of the held crystals and the filter paper after filtration are weighed, and a difference between before and after the filtration is determined to quantify the cyclic ester crystals having the structure represented by general formula (I). Thus, the crystals held after filtration have particle diameters of 1 μm or larger, and a rate of content of the crystals of the cyclic ester having the structure represented by general formula (I) that have a particle diameter of 1 μm or larger in the ink is lower than 4 ppm.

Although merely presumed as the mechanism of decreasing and extinguishing the cyclic ester crystals, it is considered that the cyclic ester compound is hydrolyzed by warming the ink in the presence of a pH conditioner (base compound) contained in the ink, furthermore the base compound is added to the opened carboxyl group, so that the cyclic ester compound becomes water-soluble, and finally the cyclic ester crystals in the ink composition decrease and disappear.

Incidentally, whether the ink contains the cyclic ester having the structure represented by general formula (I) can be determined by separating the precipitated crystals from the ink and qualitatively analyzing the crystals by GC-MS analysis, and a combination of liquid chromatography-mass spectrometry (LC-MS) analysis, $C^{13}$-nuclear magnetic resonance (NMR), and $H^1$-NMR+ Fourier-transform infrared spectroscopy (FT-IR).

In addition, to sufficiently secure wettability of the ink applied onto the impermeable media for signages and commercial printing paper, it is preferable that a dynamic surface tension of the ink with a surface life of 15 msec in accordance with a 25° C. maximum bubble pressure method be decreased to 34.0 mN/m or lower, and a static surface tension of the ink at 25° C. be maintained at 20.0 mN/m or higher.

Owing to the above situation, the image quality is also improved, and ink storage stability, liquid permeability, and discharge stability are also improved.

The dynamic surface tension of the ink with the surface life of 15 msec in accordance with the maximum bubble pressure method can be measured using e.g. SITA DynoTester (manufactured by SITA Messtechnik GmbH) at 25° C.

The static surface tension of the ink can be measured using e.g. an automatic surface tensiometer (DY-300, manufactured by Kyowa Interface Science Co., Ltd.) at 25° C.

When a balance between the dynamic surface tension and the static surface tension is optimized in the ink and a receding contact angle of the ink with respect to the nozzle plate is adjusted to 35° or larger, an ink-repellent film of a nozzle plate on an ink discharge head is hardly wetted, discharge stability can be secured, and an extremely stable and ideal printer that does not cause a phenomenon called "nozzle omission" during continuous discharge is provided.

The receding contact angle of the ink with respect to the nozzle plate is 35° or larger, preferably 35° or larger and 80° or smaller, more preferably 40° or larger and 70° or smaller.

When the receding contact angle is 35° or larger, even when the ink adheres to the ink chamber inner wall of the ink discharge head, the ink can be easily repelled again. The larger the receding contact angle is, the harder the wetting is. Therefore, although the upper limit of the receding contact angle is not particularly limited in relation to the wettability, the upper limit is preferably set to not larger than 80° (80° or smaller) in consideration of wettability, permeability, and the like to a recording medium.

The receding contact angle can be measured using e.g. an automatic contact angle measuring apparatus, with enlargement/reduction methods.

Examples of the automatic contact angle measuring apparatus include, but are not limited to, a contact angle meter DMo-501 (manufactured by Kyowa Interface Science Co., Ltd.).

The receding contact angle can be measured e.g. by extruding 2 μL of ink from a syringe against the outer surface of the nozzle plate used in the present disclosure, using the aforementioned apparatus, in accordance with the reduction method. The receding contact angle in the present disclosure refers to an angle value at a measurement temperature of 25° C.

A static surface tension B of the ink at 25° C. is preferably 20.0 mN/m or higher and 30.0 mN/m or lower.

When the static surface tension is 20.0 mN/m or higher and 30.0 mN/m or lower, the wettability of the ink to impermeable media for signages and commercial printing paper can be sufficiently improved, and effects of decreasing cockling and curling is enhanced, and the permeation and drying is improved even in plain paper printing.

Next, the ink composition and the method for producing the ink composition will be explained in detail.

Ink Composition

—Organic Solvent—

Preferably, the ink according to an embodiment of the present invention contains at least one organic solvent having a solubility parameter (SP value) of 8.9 to 12.0 (hereinafter referred to as "organic solvent X").

In addition, as described below, the ink according to an embodiment of the present invention preferably contains a diol compound as an organic solvent, and the diol compound may also serve as the organic solvent having a solubility parameter (SP value) of 8.9 to 12.0. Thereby, the wettability to the recording medium is improved, ink components permeate even a commercial printing paper such as a coated paper having a coated layer with poor ink absorbability, and beading can be suppressed. In addition, even an impermeable medium can be easily wetted with the ink.

The organic solvent X is preferably a water-soluble organic solvent, particularly preferably an amide compound represented by the following general formula (A) or an oxetane compound represented by the following general formula (B).

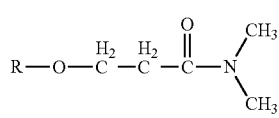

general formula (A)

where R represents an alkyl group having 1 to 6 carbon atoms.

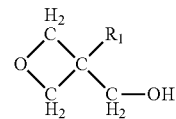

general formula (B)

where $R_1$ represents an alkyl group having 1 to 2 carbon atoms.

Since an organic solvent having an SP value of 8.9 or higher is generally suitable for aqueous inks as in the present disclosure because of high water solubility and difficulty in separation. In addition, an organic solvent having an SP value of 12.0 or lower is good in drying property and beading property.

The SP value means a value defined in accordance with the regular solution theory introduced by Hildebrand and is a criterion for a solubility of a two-component solution. The SP value described in the present disclosure is a value calculated in accordance with the Fedors method. In addition, the SP value is represented by a square root of a cohesive energy density in the regular solution theory, with a unit of $(J/cm^3)^{0.5}$. The SP value can be calculated by a widely-used simple software program.

Examples of the amide compound represented by general formula (A) include, but are not limited to, compounds represented by the following formulas (1) to (4).

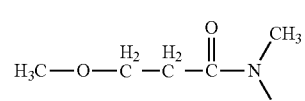

formula (1)

(SP value: 9.19)

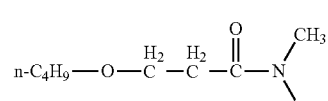

formula (2)

(SP value: 9.03)

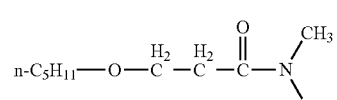

formula (3)

(SP value: 9.00)

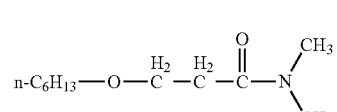

formula (4)

(SP value: 8.96)

In addition, examples of the oxetane compound represented by general formula (B) include, but are not limited to, compounds represented by the following formulas (5) and (6).

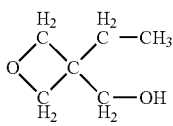

(SP value: 11.31)

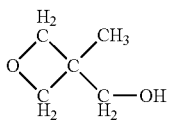

(SP value: 11.79)

A rate of content of the organic solvent X in the ink is preferably 3% by mass or higher, more preferably 5 to 20% by mass. When the rate of content is 5% by mass or higher, the ink components permeate even into a commercial printing paper, beading can be suppressed, and an effect of facilitating wetting of an impermeable medium can be obtained. In addition, when the rate of content is 20% by mass or lower, the deteriorated discharge stability due to an increased ink viscosity is avoided.

Furthermore, in the present disclosure, when a glycol ether compound ("compound Z") showing a vapor pressure of 50 mmHg or higher under an environment of 100° C. is blended as an organic solvent, the drying property is improved and increased even on a commercial printing paper. Furthermore, even when an image portion comes into contact with a conveying roller immediately after warm-air drying at 100° C., the image is not transferred to the roller, and a high-speed productivity is secured.

The compound Z is preferably soluble in high-purity water. Examples of the compound Z include, but are not limited to, propyleneglycol monopropyl ether (boiling point (bp): 150° C., vapor pressure: 107 mmHg), propyleneglycol monoethyl ether (bp: 133° C., vapor pressure: 252 mmHg), propyleneglycol monomethyl ether (bp: 120° C., vapor pressure: 360 mmHg), propyleneglycol monobutyl ether (bp: 170° C., vapor pressure: 59 mmHg), 3-methoxy-1-butanol (bp: 161° C., vapor pressure: 76 mmHg), and 3-methoxy-3-methyl-1-butanol (bp: 174° C., vapor pressure: 50 mmHg).

In addition, for improving the discharge stability and the ink storage stability, it is preferable to blend the following organic solvent into the ink:

diethyleneglycol (bp: 245° C.), triethyleneglycol (bp: 285° C.), tetraethyleneglycol (bp: 324 to 330° C.), 1,3-butanediol (bp: 203 to 204° C.), glycerol (bp: 290° C.), diglycerol (bp: 270° C./20 hPa), 1,2,3-butanetriol (bp: 175° C./33 hPa), 1,2,4-butanetriol (bp: 190 to 191° C./24 hPa), dipropyleneglycol (bp: 232° C.), 1,5-pentanediol (bp: 242° C.), propyleneglycol (bp: 187° C.), 2-methyl-2,4-pentanediol (bp: 197° C.), ethyleneglycol (bp: 196 to 198° C.), tripropyleneglycol (bp: 267° C.), hexyleneglycol (bp: 197° C.), polyethyleneglycol (viscous liquid to solid), 1,6-hexanediol (bp: 253 to 260° C.), 1,2,6-hexanetriol (bp: 178° C.), trimethylolethane (solid, melting point (mp): 199 to 201° C.), trimethylolpropane (solid, mp: 61° C.), or the like.

A content ratio (mass ratio) between the organic solvent X and the compound Z in the ink is preferably 1:1 to 8:1, more preferably 3:1 to 5:1. When this content is 1:1 or higher, i.e. when the organic solvent X content is higher than the compound Z content, the drying property is not extremely improved, and disadvantages in the discharge stability due to a dried inside of the inkjet head are not caused. When the ratio is 8:1 or lower, the organic solvent X is not too much, the drying property on commercial printing paper is improved, and the productivity is improved.

The total rate of content of the organic solvent in the ink containing the organic solvent X and the compound Z is preferably 5 to 30% by mass. When the total rate of content of the organic solvent is 5% by mass or higher, the effect of suppressing the beading on the commercial printing paper is not lowered. In addition, when the total rate of content is 30% by mass or lower, disadvantages in the discharge stability due to an extremely-increased ink viscosity are not caused.

In addition, for the discharge stability and ink storage stability, it is preferable to blend a polyalcohol as the organic solvent. Specific examples of the polyalcohol include, but not limited to, diethyleneglycol (bp: 245° C.), triethyleneglycol (bp: 285° C.), tetraethyleneglycol (bp: 324 to 330° C.), 1,3-butanediol (bp: 203 to 204° C.), glycerol (bp: 290° C.), diglycerol (bp: 270° C./20 hPa), 1,2,3-butanetriol (bp: 175° C./33 hPa), 1,2,4-butanetriol (bp: 190 to 191° C./24 hPa), dipropyleneglycol (bp: 232° C.), 1,5-pentanediol (bp: 242° C.), propyleneglycol (bp: 187° C.), 2-methyl-2,4-pentanediol (bp: 197° C.), ethyleneglycol (bp: 196 to 198° C.), tripropyleneglycol (bp: 267° C.), hexyleneglycol (bp: 197° C.), polyethyleneglycol (viscous liquid to solid), 1,6-hexanediol (bp: 253 to 260° C.), 1,2,6-hexanetriol (bp: 178° C.), trimethylolethane (solid, mp: 199 to 201° C.), and trimethylolpropane (solid, mp: 61° C.).

—Water-Dispersible Resin Particle—

A water-dispersible resin particle having excellent film formability (image-forming property), solvent resistance, high water resistance, and high weather resistance is useful for recording images with high water resistance and high image density (high color developing property. Examples of such a water-dispersible resin particle include, but are not limited to, a condensed synthetic resin, an added synthetic resin, and a natural polymer compound. In the present disclosure, the ink contains polyurethane resin particles.

In addition, since impermeable media for signages are poor in ink fixity, the material of the water-dispersible resin particle material should be appropriately selected, or an addition amount of the water-dispersible resin particle material should be increased. Furthermore, to improve the fixity of the ink to an impermeable medium film, a large amount of polyurethane resin particles synthesized from a polyol raw material containing an aromatic ring, having the structure represented by general formula (I), is used.

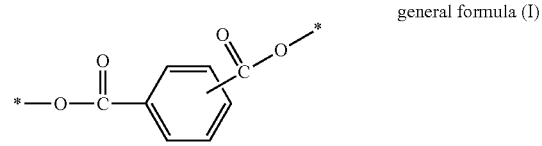

general formula (I)

Examples of the polyol raw material containing an aromatic ring, having the structure represented by general formula (I), include, but are not limited to, terephthalic acid and isophthalic acid. When terephthalic acid and isophthalic acid are used as raw materials, a cyclic ester compound is produced. It has been confirmed by GC-MS that, when using the above two types of raw materials, a cyclic ester is produced from the mixture of two phthalic acids.

In the present disclosure, it is preferable that the polyurethane resin particles be produced by using the polyol raw material containing an aromatic ring, having the structure represented by general formula (I), as a raw material, and have the structure represented by general formula (I).

A proportion of the polyol raw material containing an aromatic ring, having the structure represented by general formula (I), in the polyurethane resin particles having the structure represented by general formula (I) is preferably about 50% based on the polyol, and about 10 to 30% based on the polyurethane resin. When the proportion of the polyol raw material is within the above range, excellent alcohol resistance is obtained.

Other examples of the condensed synthetic resin include, but are not limited to, a polyester resin, a polyurethane resin, a polyepoxy resin, a polyamide resin, a polyether resin, a poly(meth)acrylic resin, an acryl-silicone resin, and a fluororesin. Examples of the added synthetic resin include, but are not limited to, a polyolefin resin, a polystyrene-based resin, a polyvinyl alcohol-based resin, a polyvinyl ester-based resin, a polyacrylic acid-based resin, and an unsaturated carboxylic acid-based resin. Examples of the natural polymer compound include, but are not limited to, a cellulose, a rosin, and a natural rubber.

Above all, the polyurethane resin particle is preferable in consideration of the ink fixity. In addition, two or more types of the water-dispersible resins may be used in combination.

As the water-dispersible resin, a resin having a hydrophilic group by itself to have self-dispersibility, or a resin having no dispersibility by itself and provided with dispersibility from a surfactant or a resin having a hydrophilic group can be used. Above all, an ionomer of a polyester resin or a polyurethane resin, and a resin particle emulsion obtained by emulsification and suspension polymerization of an unsaturated monomer are most suitable.

In the case of emulsion polymerization of the unsaturated monomer, the resin emulsion is obtained by reacting the unsaturated monomer in water to which the unsaturated monomer, a polymerization initiator, a surfactant, a chain transfer agent, a chelating agent, a pH conditioner, and the like are added, therefore the water-dispersible resin can be easily obtained, and the resin constitution can be easily changed, and a desired property can be easily obtained.

Since the water-dispersible resin may be subjected to molecular chain breakage such as dispersion destruction and hydrolysis under a strong alkali or strong acid environment, the pH is preferably 4 to 12, and particularly from the viewpoint of miscibility with a water-dispersible colorant, more preferably 7 to 11, and even more preferably 8 to 10.5.

In addition, the water-dispersible resin has an action of fixing the water-dispersible colorant to a medium and has a function of forming a film at room temperature or higher to improve the fixity of the colorant. Thus, a minimum film forming temperature (MFT) of the water-dispersible resin is preferably 100° C. or lower. In addition, when a glass transition temperature of the water-dispersible resin is −40° C. or lower, the viscosity of the resin film becomes higher, and a tack is caused on a printed medium. Therefore, the glass transition temperature is preferably −30° C. or higher. A rate of content of the water-dispersible resin in the ink is preferably 0.5 to 20% by mass, more preferably 1 to 15% by mass in terms of solid content. However, when sufficiently considering a substrate fixity of the colorant to impermeable media for signages and commercial printing paper, a rate of solid content of the polyurethane resin particles in the ink is 3% by mass or higher, and a solid content mass ratio between the colorant and the polyurethane resin particles is preferably 1.0:(2.0 to 12.0), particularly preferably 1.0:(2.0 to 11.0). Incidentally, although the polyurethane resin particles are used in a form of a dispersion in producing the ink, the rate of content of the polyurethane resin particles in the ink refers to a rate of content of the polyurethane resin particles as a solid content in the ink.

—Colorant—

The ink according to an embodiment of the present invention may be a clear ink containing no colorant but may be an ink containing a colorant. The colorant is preferably a pigment.

Examples of the colorant include, but are not limited to, a surfactant dispersion in which a pigment is dispersed with a surfactant, a resin dispersion in which a pigment is dispersed with a resin, a resin-coated pigment in which a pigment surface is coated with a resin, and a self-dispersion pigment in which a hydrophilic group is provided on a pigment surface, but a water-soluble pigment is preferable. Above all, the resin-coated pigment or the self-dispersion pigment of which the surface has least one hydrophilic group is preferable.

Examples of such a hydrophilic group include, but are not limited to, —COOM, —$SO_3$M, —$PO_3$HM, —$PO_3M_2$, —$CONM_2$, —$S_3NM_2$, —NH—$C_6H_4$—COOM, —NH—$C_6H_4$—$SO_3$M, —NH—$C_6H_4$—$PO_3$HM, —NH—$C_6H_4$—$PO_3M_2$, —NH—$C_6H_4$—$CONM_2$, and —NH—$C_6H_4$—$SO_3NM_2$. These hydrophilic groups can be introduced by a known method.

In addition, the counter ion M in the hydrophilic group is preferably a quaternary ammonium ion. Specific examples of the quaternary ammonium ion include, but are not limited to, tetramethylammonium ion, tetraethylammonium ion, tetrapropylammonium ion, tetrabutylammonium ion, tetrapentylammonium ion, benzyltrimethylammonium ion, benzyltriethylammonium ion, and tetrahexylammonium ion. Above all, tetraethylammonium ion, tetrabutylammonium ion, and benzyltrimethylammonium ion are preferable, and tetrabutylammonium ion is particularly preferable.

An ink using the above pigment has particularly high storage stability over time and suppresses increase in viscosity during water evaporation. The reason for this is probably that, even when water evaporates from the water-rich ink and the ink becomes an organic solvent-rich ink, stable dispersion of the pigment can be maintained by the hydrophilic group having the quaternary ammonium ion.

As a colorant other than the pigment having the hydrophilic group, a polymer emulsion in which a pigment is contained in a polymer fine particle is preferable. The pigment may be encapsulated in the polymer fine particle or adsorbed on the surface of the polymer fine particle. In this case, all the pigments need not be encapsulated or adsorbed, and the pigment may be partially dispersed in the emulsion. Examples of the polymer for the polymer fine particle include, but are not limited to, a vinyl-based polymer, a polyester-based polymer, and a polyurethane-based polymer. Above all, the vinyl-based polymer and the polyester-based polymer are particularly preferable. Specific examples of the polymer for the polymer fine particle include, but are not limited to, polymers disclosed in Japanese Unexamined Patent Application Publication No. 2000-53897 and 2001-139849.

Also, a composite pigment prepared by coating particles of a general organic pigment or inorganic pigment with an organic pigment or carbon black can be used. The composite pigment can be prepared by a method for precipitating an organic pigment in the presence of inorganic pigment particles, a mechanochemical method for mechanically mixing and grinding an inorganic pigment and an organic pigment, or the like. Furthermore, optionally a layer of an organosilane compound produced from polysiloxane and alkylsilane can be provided between the inorganic pigment and the organic pigment to improve adhesiveness between the inorganic pigment and the organic pigment.

A mass ratio between the inorganic pigment particles and the organic pigment or carbon black as the colorant is preferably 3:1 to 1:3, more preferably 3:2 to 1:2. When the amount of the colorant is within the above range, color developing properties and colorability are not lowered, and transparency and color tone are not deteriorated.

As the aforementioned composite pigment, silica/carbon black composite material, silica/phthalocyanine PB15:3 composite material, silica/disazo yellow composite material, silica/quinacridone PR122 composite material, and the like, manufactured by TODA KOGYO CORP. are preferable because of a small primary average particle diameter.

Herein, when an inorganic pigment particle having a primary particle diameter of 20 nm is coated with an equivalent amount of an organic pigment, the primary particle diameter of this pigment is about 25 nm. If this inorganic pigment particle can be dispersed using an appropriate dispersant until the particle diameter becomes the primary particle diameter, a very fine pigment dispersion ink having a dispersion particle diameter of 25 nm can be prepared. In the composite pigment, the organic pigment on the surface contributes to dispersion, and furthermore the property of the inorganic pigment in the core of the particle appears through the organic pigment thin layer having a thickness of about 2.5 nm. Thus, it is also significant to select a pigment dispersant that makes it possible to simultaneously disperse and stabilize both the inorganic pigment and the organic pigment.

Examples of the inorganic pigment include, but are not limited to, titanium oxide, iron oxide, calcium carbonate, barium sulfate, aluminum hydroxide, barium yellow, cadmium red, and chrome yellow, and carbon black. Above all, carbon black is particularly preferable. Examples of carbon black include, but are not limited to, channel black, furnace black, gas black, lamp black, which are produced by a known method such as a contact method, a furnace method, and a thermal method.

Examples of the organic pigment include, but are not limited to, an azo pigment, a polycyclic pigment, a dye chelate, a nitro pigment, a nitroso pigment, and aniline black. Above all, the azo pigment, the polycyclic pigment, and the like are preferable. Incidentally, examples of the azo pigment include, but are not limited to, an azo lake, an insoluble azo pigment, a condensed azo pigment, and a chelate azo pigment. Example of the polycyclic pigment include, but are not limited to, a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include, but are not limited to, a basic dye type chelate, and an acidic dye type chelate.

Examples of the organic pigment include, but are not limited to, Color Index (C. I.) Pigment Yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 139, 150, 151, 153, 180, 183, 185, 213, C.I. Pigment Orange 5, 13, 16, 17, 36, 43, 51, C.I. Pigment Red 1, 2, 3, 5, 17, 22, 23, 31, 38, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 185, 190, 193, 209, 219, C.I. Pigment Violet 1 (Rhodamine Lake), 3, 5:1, 16, 19, 23, 38, C.I. Pigment Blue 1, 2, 15 (Phthalocyanine Blue), 15:1, 15:2, 15:3 (Phthalocyanine Blue), 16, 17:1, 56, 60, 63, and C.I. Pigment Green 1, 4, 7, 8, 10, 17, 18, 36.

A Brunauer-Emmett-Teller (BET) specific surface area of the pigment for use is preferably about 10 to about 1,500 $m^2/g$, more preferably about 20 to about 600 $m^2/g$, even more preferably about 50 to about 300 $m^2/g$.

If a pigment having a desired specific surface area is not easily available, the pigment may be reduced so as to have a relatively small particle diameter by conducting common size reduction or pulverization (e.g. ball mill pulverization, jet mill pulverization, sonication).

The water-dispersible colorant preferably has a median diameter $D_{50}$ of 10 to 200 nm in the ink.

A rate of content of the water-dispersible colorant in the ink is preferably 1 to 15% by mass, more preferably 1.5 to 10% by mass in terms of solid content. When the rate of content is 1% by mass or higher, a color developing property of the ink and an image density are improved, and when the rate of content is 15% by mass or lower, the ink does not increase the viscosity and the dischargeability is not deteriorated, and furthermore the content is economically preferable.

In the present disclosure, a dye may be used in combination for the purpose of adjusting a color tone, but the dye is used in a range that does not deteriorate a weather resistance.

—Surfactant—

In the present disclosure, it is preferable to use a polyether-modified siloxane compound as a surfactant, so that a dynamic surface tension of the ink with a surface life of 15 msec in accordance with a 25° C. maximum bubble pressure method is decreased to 34.0 mN/m or lower, and a static surface tension of the ink at 25° C. is maintained at 20.0 mN/m or higher. Thereby, the ink-repellent film of the head nozzle plate is hardly wetted with the ink, and discharge failure due to the ink adhering to the nozzle is prevented, so that discharge stability is improved. In addition, adhesion of the ink to the ink-repellent film surface of the nozzle, which is particularly problematic, can be avoided to obtain an ink that hardly causes discharge failure.

Above all, surfactants represented by the following general formulas (IV) to (VII) are preferable, and it is particularly preferable to use such a surfactant that the dispersion stability is not impaired depending on a type of the water-dispersible colorant and a combination of the organic solvents, the dynamic surface tension is low, and the permeability and leveling property are high.

These surfactants may be used alone or in combination.

general formula (IV)

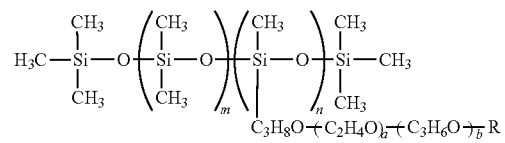

where R represents hydrogen atom or an alkyl group having 1 to 4 carbon atoms, m represents an integer of 0 to 23, n represents an integer of 1 to 10, a represents an integer of 1 to 23, and b represents an integer of 0 to 23.

general formula (V)

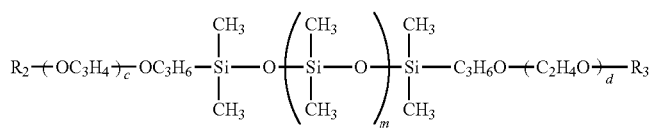

where $R_2$ and $R_3$ each independently represent hydrogen atom or an alkyl group having 1 to 4 carbon atoms, m represents an integer of 1 to 8, and c and d each independently represent an integer of 1 to 10.

general formula (VI)

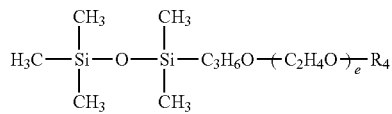

where $R_4$ represents hydrogen atom or an alkyl group having 1 to 4 carbon atoms, and e represents an integer of 1 to 8.

general formula (VII)

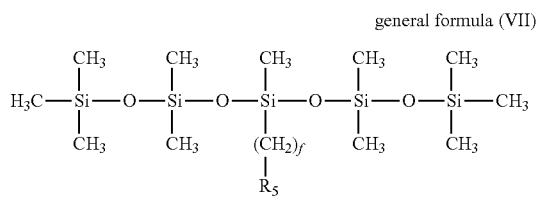

where $R_5$ represents a polyether group represented by the following general formula (C), and f represents an integer of 1 to 8.

general formula (C)

where $R_6$ represents hydrogen atom or an alkyl group having 1 to 4 carbon atoms, g represents an integer of 0 to 23, and h represents an integer of 0 to 23, except for a case that g and h simultaneously represent 0.

Next, specific examples of the compounds represented by general formulas (IV) to (VII) will be described.

Examples of the compound represented by general formula (IV) include, but are not limited to, compounds represented by the following formulas (7) to (14).

formula (7)

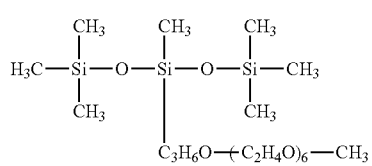

formula (8)

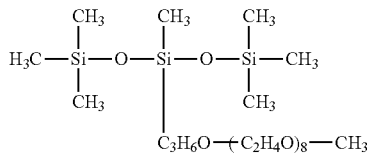

formula (9)

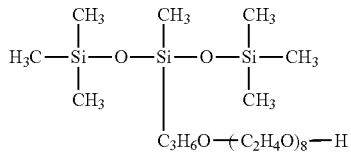

formula (10)

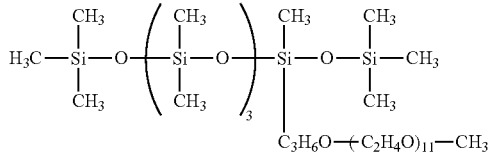

formula (11)

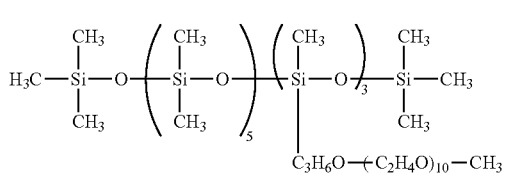

formula (12)

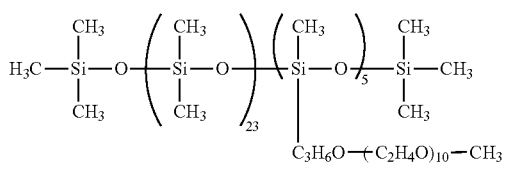

formula (13)

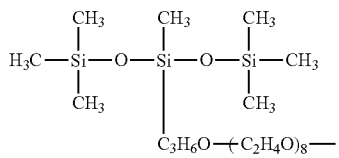

formula (14)

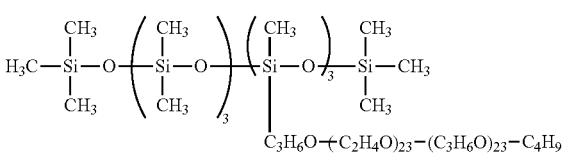

Examples of the compound represented by general formula (V) include, but are not limited to, a compound represented by the following formula (15).

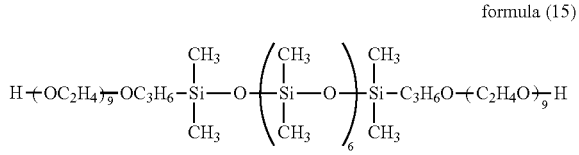
formula (15)

Examples of the compound represented by general formula (VI) include, but are not limited to, a compound represented by the following formula (16).

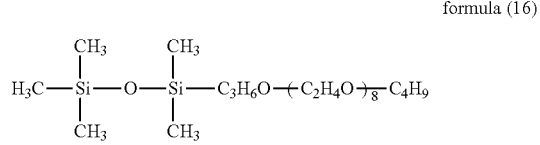
formula (16)

Examples of the compound represented by general formula (VII) include, but are not limited to, compounds represented by the following formulas (17) to (19).

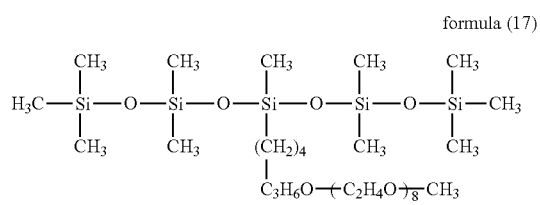
formula (17)

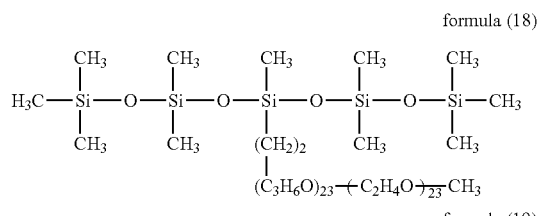
formula (18)

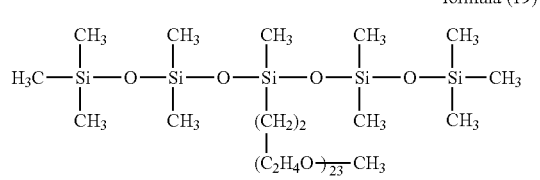
formula (19)

Furthermore, examples of commercially-available polyether-modified siloxane compound surfactants having the same effect as of the aforementioned compounds include, but are not limited to, 71ADDITIVE, 74ADDITIVE, 57ADDITIVE, 8029ADDITIVE, 8054ADDITIVE, 8211ADDITIVE, 8019ADDITIVE, 8526ADDITIVE, FZ-2123, and FZ-2191 manufactured by Dow Corning Toray Co., Ltd., TSF4440, TSF4441, TSF444, TSF4446, TSF4450, TSF4452, TSF4460 manufactured by Momentive Performance Materials Inc., SILFACE SAG002, SILFACE SAG003, SILFACE SAG005, SILFACE SAG503A, SILFACE SAG008 and SILFACE SJM003 manufactured by Nissin Chemical co., ltd., TEGO Wet KL245, TEGO Wet 250, TEGO Wet 260, TEGO Wet 265, TEGO Wet 270, TEGO Wet 280 manufactured by Evonik Industuies AG, and BYK-345, BYK-347, BYK-348, BYK-375, BYK-377 manufactured by BYK Japan KK.

In addition, the polyether-modified siloxane compound surfactant may be used optionally in combination with a fluorine-based surfactant, a silicone-based surfactant, or an acetylene glycol or acetylene alcohol-based surfactant.

A rate of content of the surfactant in the ink is preferably 0.001 to 5% by mass, more preferably 0.5 to 3% by mass. When the rate of content is 0.001% by mass or higher, the effect of adding the surfactant is obtained. However, when the rate of content is higher than 5% by mass, the effect of addition is saturated, and therefore it is meaningless to increase the content.

—Other Components—

Besides the aforementioned components, various known additives may be optionally added to the ink according to an embodiment of the present invention. Examples of the additives include, but are not limited to, a foam inhibitor (antifoaming agent), a water-dispersible resin, a pH conditioner, an antiseptic and antifungal agent, a chelating reagent, an antirust agent, an antioxidant, an ultraviolet absorber, an oxygen absorber, and a light stabilizer.

The organic solvent preferably contains at least one non-wetting polyol compound or glycol ether compound having 8 to 11 carbon atoms. Preferably, the polyol compound includes a diol compound. Herein, the term "non-wetting" means that a solubility is 0.2 to 5.0% by mass in water at 25° C. Above all, 1,3-diol compound represented by the following general formula (VIII) is preferable, and 2-ethyl-1,3-hexanediol [solubility: 4.2% (25° C.)], 2,2,4-trimethyl-1,3-pentanediol [solubility: 2.0% (25° C.)] are particularly preferable.

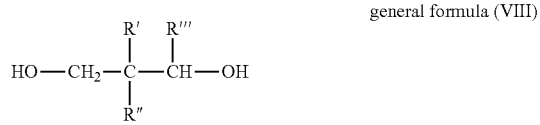
general formula (VIII)

where R' represents a methyl group or an ethyl group, R" represents hydrogen or a methyl group, and R'" represents an ethyl group or a propyl group.

Other examples of the non-wetting polyol compound include, but are not limited to, aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexene-1,2-diol.

A rate of content of the non-wetting polyol compound and glycol ether compound having 8 to 11 carbon atoms in the ink is preferably 0.5 to 4% by mass, more preferably 1 to 3% by mass. When the rate of content is 0.5% by mass or higher, the ink permeation effect is obtained and the image quality is improved. When the rate of content is 4% by mass or lower, the polyol compound and glycol compound sufficiently dissolve in the ink, and therefore defects such as a high initial viscosity of the separated ink are not caused.

Foam Inhibitor

A foam inhibitor is used to suppress foaming of the ink by adding a small amount of the foam inhibitor to the ink. Herein, the term "foaming" means that a liquid forms a thin film to wrap air. This foaming involves properties of the ink, such as surface tension and viscosity. That means, like water, a liquid having a high surface tension hardly foams due to a force to decrease the surface area of the liquid as much as possible. In contrast, the ink having the high viscosity and high permeability easily foams due to a low surface tension, and hardly deforms because the generated foams are easily maintained by the viscosity of the solution.

Normally, the foam inhibitor locally decreases the surface tension of the foam film to break the foam, or alternatively a foam inhibitor insoluble in a foam liquid is scattered on the surface of the foam liquid to break the foam. When a polyether-modified siloxane compound surfactant having an extremely strong action of decreasing the surface tension is used as a surfactant for the ink, even if using the foam inhibitor with the former mechanism, it is impossible to locally decrease the surface tension of the foam film. Thus, the latter foam inhibitor insoluble in the foam liquid is used, but in this case, stability of the ink decreases due to the foam inhibitor insoluble in the solution.

On the other hand, although the surface tension-decreasing action of the foam inhibitor represented by the following general formula (IX) is not as strong as that of the polyether-modified siloxane compound surfactant, the foam inhibitor represented by general formula (IX) has a high compatibility with the surfactant. Thus, it is considered that the foam inhibitor is efficiently incorporated into the foam film, and the surface of the foam film becomes locally unbalanced due to the difference in the surface tension between the surfactant and the foam inhibitor, so that the foam is broken.

general formula (IX)

where each of $R_7$ and $R_8$ independently represents an alkyl group having 3 to 6 carbon atoms, each of $R_9$ and $R_{10}$ independently represents an alkyl group having 1 to 2 carbon atoms, n represents an integer of 1 to 6.

Preferable examples of the compound represented by general formula (IX) include, but are not limited to, 2,4,7,9-tetramethyldecane-4,7-diol, and 2,5,8,11-tetramethyldodecane-5,8-diol. Because of a foam inhibition effect and a high compatibility with the ink, 2,5,8,11-tetramethyldodecane-5,8-diol is particularly preferable.

A rate of content of the foam inhibitor in the ink is preferably 0.01 to 10% by mass, more preferably 0.1 to 5% by mass. When the rate of content is 0.01% by mass, a foam inhibition effect is obtained, and when the rate of content is 10% by mass or lower, the foam inhibition effect is not limited, and ink physical properties such as viscosity and particle diameter are not adversely affected.

—pH Conditioner—

The pH conditioner is not particularly limited as long as a pH can be adjusted to 7 to 11 without adversely affecting the formulated ink, and can be appropriately selected depending on an intended purpose.

Examples of the pH conditioner include, but are not limited to, an alcohol amine, a hydroxide of an alkali metal element, an ammonium hydroxide, a phosphonium hydroxide, and an alkali metal carbonate.

When the pH is out of the range of 7 to 11, an inkjet head and an ink supply unit are considerably dissolved out, which may cause defects such as degeneration, leakage, and discharge failure of the ink.

Examples of the alcohol amine include, but are not limited to, diethanolamine, triethanolamine, and 2-amino-2-ethyl-1,3 propanediol.

Examples of the hydroxide of the alkali metal element include, but are not limited to, lithium hydroxide, sodium hydroxide, and potassium hydroxide.

Examples of the ammonium hydroxide include, but are not limited to, ammonium hydroxide, and quaternary ammonium hydroxide.

Examples of the phosphonium hydroxide include, but are not limited to, quaternary phosphonium hydroxide.

Examples of the alkali metal carbonate include, but are not limited to, lithium carbonate, sodium carbonate, and potassium carbonate.

As the pH conditioner, preferably a strongly basic compound, more preferably potassium hydroxide or sodium hydroxide is used. Also, it is preferable to use 2-amino-2-ethyl-1,3 propanediol as the pH conditioner.

—Antiseptic and Antifungal Agent—

Examples of the antiseptic and antifungal agent include, but are not limited to, sodium dehydroacetate, sodium sorbate, sodium 2-pyridinethiol-1-oxide, sodium benzoate, and sodium pentachlorophenol.

—Chelating Reagent—

Examples of the chelating reagent include, but are not limited to, sodium ethylenediaminetetraacetate, sodium nitrilotriacetate, sodium hydroxyethylethylenediaminetriacetate, sodium diethylenetriaminepentaacetate, and sodium uramildiacetate.

—Antirust Agent—

Examples of the antirust agent include, but are not limited to, acidic sulfite, sodium thiosulfate, ammonium thiodiglycolate, diisopropylammonium nitrite, pentaerythritol tetranitrate, and dicyclohexylammonium nitrite.

—Antioxidant—

Examples of the antioxidant include, but are not limited to, a phenol-based antioxidant (including a hindered phenol-based antioxidant), an amine-based antioxidant, a sulfur-based antioxidant, and a phosphorus-based antioxidant.

—Ultraviolet Absorber—

Examples of the ultraviolet absorber include, but are not limited to, a benzophenone-based ultraviolet absorber, a benzotriazole-based ultraviolet absorber, a salicylate-based ultraviolet absorber, a cyanoacrylate-based ultraviolet absorber, and a nickel complex salt-based ultraviolet absorber.

—Production of Ink—

The ink according to an embodiment of the present invention can be produced by a stirring and mixing step in which an organic solvent, polyurethane resin particles, water, and optionally a colorant to be added, as well as other components are dispersed or dissolved in an aqueous medium, and further optionally stirred and mixed, and a step of warming the obtained mixture at 40° C. or higher and lower than 70° C. for 6 hours or longer. This stirring and mixing step can be conducted using e.g. a sand mill, a homogenizer, a ball mill, a paint shaker, an ultrasonic dispersing machine, or the like. The stirring and mixing step can be conducted by a stirrer equipped with a common stirring blade, a magnetic stirrer, a high-speed disperser, or the like.

—Ink Physical Property—

Physical properties of the ink according to an embodiment of the present invention are not particularly limited, and can be appropriately selected depending on an intended purpose.

However, it is preferable that a static surface tension of the ink is set to 20 mN/m or higher and a dynamic surface tension with a bubble life time of 15 msec in accordance with the maximum bubble pressure method is set to 34 mN/m or lower, because a nozzle plate OPTOOL waterrepellent film of the inkjet head is hardly wetted with the ink while sufficient wettability to a recording medium can be secured, the discharge stability can also be secured, and an extremely stable ink can be obtained.

In addition, a viscosity of the ink at 25° C. is preferably 5 to 25 mPa·s, more preferably 6 to 20 mPa·s. When the viscosity is 5 mPa·s or higher, effects of improving the printing density and character quality can be obtained. In addition, when the viscosity is 25 mPa·s or lower, the ink dischargeability can be secured.

The viscosity can be measured using e.g. a viscometer (RE-85L, manufactured by TOKI SANGYO CO., LTD.) at 25° C.

In addition, to secure the storage stability of the ink, the pH is within a range of preferably 8 to 10, more preferably 8.5 to 10.

In addition, the ink according to an embodiment of the present invention may be used while stored in a container such as an ink cartridge.

Recording Medium

The recording medium capable of recording with the ink according to an embodiment of the present invention is not particularly limited, and can be appropriately selected depending on an intended purpose. Examples of the recording medium include, but are not limited to, plain paper, glossy paper, special paper, cloth, film, OHP sheet, and general-purpose printing paper. However, the ink according to an embodiment of the present invention is extremely excellent in that the ink can print a preferable image also on impermeable media for signages and commercial printing paper, similarly to other paper.

The printed matter having an image formed by using the ink according to an embodiment of the present invention has a high image quality without blur and is excellent in stability over time, and can be suitably used for various purposes as an information material or the like on which various characters or images are recorded.

In the method for printing according to an embodiment of the present invention, a heat-drying step can be optionally provided after the ink discharging step. The recording medium can be dried by e.g. an infrared dryer, a microwave dryer, a roll heater, a drum heater, hot air, or the like.

The printer according to an embodiment of the present invention includes a pretreatment liquid-applying mechanism configured to apply a pretreatment liquid containing a compound that aggregates an anionic compound on a print medium, and an ink applying-mechanism configured to apply an ink containing water, an organic solvent, and a resin particle on the print medium to which the pretreatment liquid has been applied. In the printer, the resin particle includes a polyurethane resin particle, the ink contains a cyclic ester having a structure represented by the following general formula (I), and after the ink is left to stand and stored under a room temperature environment (25±5° C.) for a month, a rate of content of the crystals of the cyclic ester having particle diameters of 1 μm or larger in the ink is lower than 4 ppm.

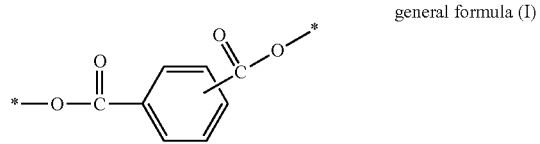

general formula (I)

Figure 3:
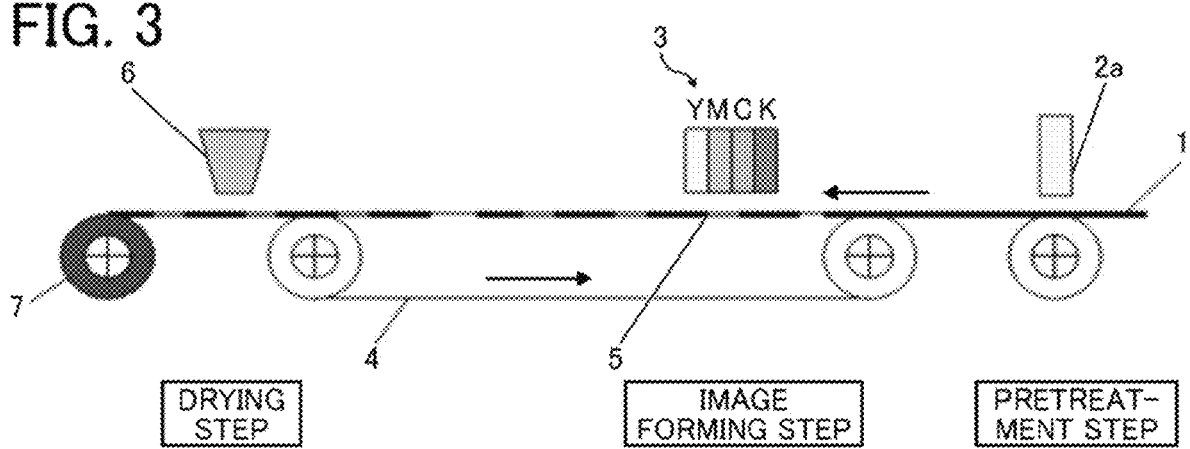
FIG. 3 is a diagram illustrating a printer according to an embodiment of the present invention.

An example of the aforementioned printer is illustrated in FIG. 3.

FIG. 3 illustrates a printer that performs an image forming step and a drying step, which includes a print medium (recording medium) 1, a pretreatment liquid discharge head 2a, an ink discharge unit 3, a conveyance belt 4, an image forming portion 5, a warm air dryer 6, and a heat roller 7.

Recording Apparatus and Method for Recording

The ink according to an embodiment of the present invention can be suitably used for various recording apparatuses employing an inkjet recording method, e.g. a printer, a facsimile machine, a copying apparatus, a multifunction peripheral combining printer/facsimile machine/copier machine, and a solid object-fabricating apparatus.

In the present disclosure, the recording apparatus and the method for recording refer to an apparatus capable of discharging an ink, various treatment liquids, and the like to a recording medium, and a method for performing recording using the apparatus, respectively. The recording medium refers to a medium to which the ink and the various treatment liquids can adhere at least temporarily.

This recording apparatus can include not only a head unit for discharging the ink but also a device related to feeding, conveyance, and ejecting of the recording medium, as well as apparatuses called a pretreatment apparatus and a post-treatment apparatus, and the like.

The recording apparatus and the method for recording may have a heating device used in the heating step and a drying device used in the drying step. The heating device and the drying device include e.g. a device configured to heat-dry a print face or a back face of the recording medium. The heating device and the drying device are not particularly limited, but e.g. a warm air heater or an infrared heater can be used. Heat-drying can be performed before, during, or after printing.

Also, the recording apparatus and the method for recording are not limited to apparatuses and methods in which significant images such as characters and figures are visualized by the ink. Examples of the recording apparatus and the method for recording include, but are not limited to, apparatuses and methods for forming a pattern such as a geometric pattern or for fabricating a three-dimensional image.

Unless otherwise specified, the recording apparatus includes both a serial type apparatus in which a discharging head is moved, and a line type apparatus in which the discharging head is not moved.

Also, this recording apparatus includes not only a desktop type recording apparatus, but also a wide recording apparatus which allows printing on an AO-size recording medium, and e.g. a continuous paper type printer capable of using a continuous paper wound in a roll shape as a recording medium.

Figure 2:
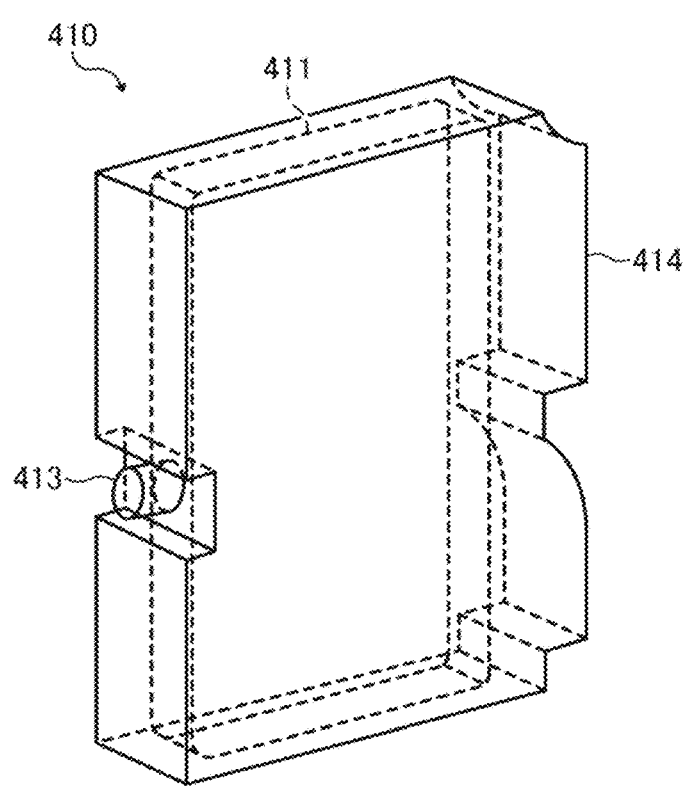
FIG. 2 is a perspective diagram illustrating a main tank for storing an ink according to an embodiment of the present invention.

An example of the recording apparatus will be described referring to FIG. 1 and FIG. 2. FIG. 1 is a descriptive perspective view of the apparatus. FIG. 2 is a descriptive perspective view of the main tank. As an example of the recording apparatus, an image forming apparatus 400 is a serial type image forming apparatus. A mechanism unit 420 is disposed inside an exterior 401 of the image forming apparatus 400. Each ink-storing unit 411 for each color main tank 410 (410k, 410c, 410m, 410y) of black (K), cyan (C), magenta (M), and yellow (Y) is formed from e.g. a packaging member such as an aluminum laminate film. The ink-storing unit 411 is housed in e.g. a plastic container case 414. Thereby, the main tank 410 is used as each color ink cartridge.

On the other hand, when a cover 401c of an apparatus body is opened, a cartridge holder 404 is disposed on an inner back side in the opening. The main tanks 410 are detachably attached to the cartridge holder 404. Thereby, each ink discharging port 413 of the main tanks 410 communicates with each color discharging head 434 through each color supplying tube 436, so that the ink can be discharged from the discharging head 434 to the recording medium.

It is preferable that a filter is disposed in the ink flow passage between the ink-storing unit (ink cartridge) 411 and the discharging head (discharging device for discharging the ink) 434 in FIG. 1. In addition, the filter may also be disposed on the ink discharging port 413. Preferably, the filter can hold particles of 10 μm or larger. Disposition of the filter makes it possible to remove particles of 10 μm or larger and to provide a printer having excellent discharge stability.

Since the filter is in contact with the ink all the time, the filter is preferably made of stainless steel for corrosion resistance. Above all, an austenite-based stainless steel is preferable, and particularly SUS304, SUS316, or SUS316L is more preferable because of excellent corrosion resistance. Incidentally, any one selected from SUS304, SUS316, and SUS316L is preferably contained in the filter, but more preferably constitutes the filter.

In addition, as the filter, filters having different filtration precisions are commercially available. For example, Acro Last Chance Filter manufactured by Nihon Pall Ltd. can be used. Use of a filter having a filtration precision of 10 μm or smaller is preferable because a solid content in the ink can be removed and the discharge stability can be improved. Use of a filter having a filtration precision of 6 μm or larger and 10 μm or smaller is preferable because the ink is suitably supplied to the discharging device.

Specific examples of the product of the filter include, but are not limited to, 10 μm Dispofilter (PALL ACRO 25 LCF-12100), having a filtration precision of 10 μm, made of polypropylene.

—Method for Printing—

In the method for printing according to an embodiment of the present invention, a heat-drying step can be optionally provided after an ink applying step. The recording medium can be dried by e.g. an infrared dryer, a microwave dryer, a roll heater, a drum heater, hot air, or the like.

Figure 4:
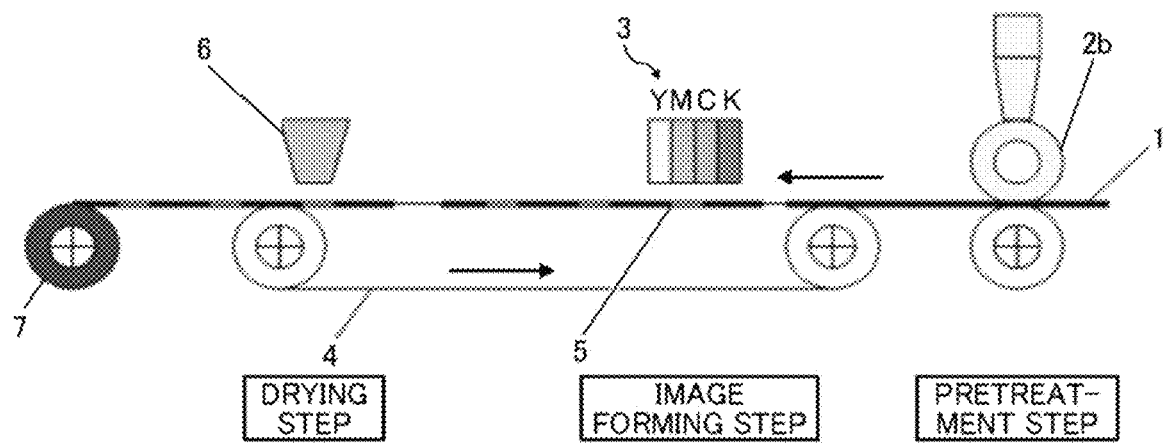
FIG. 4 is a diagram illustrating a printer according to an embodiment of the present invention.
Figure 5:
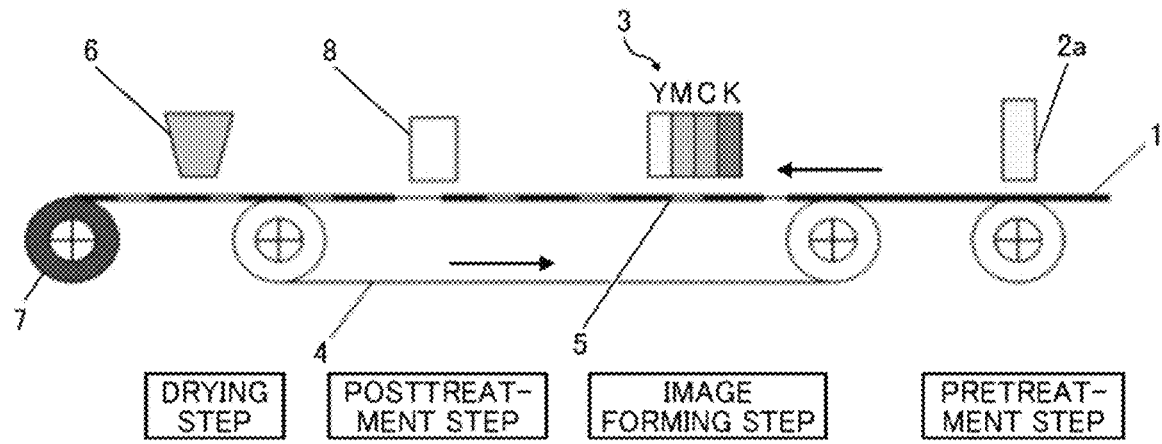
FIG. 5 is a diagram illustrating a printer according to an embodiment of the present invention.

An example of a printer that performs the method for printing according to an embodiment of the present invention will be described referring to FIG. 3 to FIG. 5. FIG. 3 and FIG. 4 each illustrate a printer that performs a pretreatment liquid applying step, an ink applying step, and a heat-drying step. FIG. 5 illustrates a printer that performs the above steps and further a posttreatment liquid applying step. In FIG. 3 to FIG. 5, a numeral 1 indicates a print matter, a numeral 2a indicates a pretreatment liquid discharge head, a numeral 2b indicates a pretreatment liquid coating roller, a numeral 3 indicates an ink discharge head, a numeral 4 indicates a conveyance belt, a numeral 5 indicates an image forming portion, a numeral 6 indicates a warm air dryer, a numeral 7 indicates a heat roller, and a numeral 8 indicates a posttreatment liquid discharge head.

In the printer in FIG. 3, the pretreatment liquid is uniformly discharged onto the print medium (also referred to as a recording medium) 1 from the pretreatment liquid discharge head 2a, and subsequently the ink is discharged from the ink discharge head 3 to form an image. After formation of the image, the ink is dried by the warm air dryer 6 and the heat roller 7.

In the printer in FIG. 4, the print medium 1 is uniformly coated with the pretreatment liquid using the pretreatment liquid coating roller 2b, and subsequently the ink is discharged from the ink discharge head 3 to form an image. After formation of the image, the ink is dried by the warm air dryer 6 and the heat roller 7.

In the printer in FIG. 5, the pretreatment liquid is uniformly discharged onto the print medium 1 from the pretreatment liquid discharge head 2a, and subsequently the ink is discharged from the ink discharge head 3 to form an image. Furthermore, for the purpose of protecting or glossing the image on the image formed portion, the posttreatment liquid is discharged from the posttreatment liquid discharge head 8. After formation of the image, the ink is dried by the warm air dryer 6 and the heat roller 7.

EXAMPLES

Hereinafter, the present invention will be more specifically described with reference to Preparation Examples, Production Examples, Examples, and Comparative Examples, but the present invention is not limited by these examples. In the examples, the "parts" means "parts by mass", and the "%" means "% by mass" unless otherwise noted.

Preparation of Pigment Dispersion

Preparation Example 1

—Preparation of Surface-Reformed Black Pigment Dispersion—

100 g of Black Pearls (registered trademark) 1000 manufactured by Cabot Corporation (carbon black having a BET specific surface area of 343 $m^2/g$ and a dibutylphthalate absorption (DBPA) of 105 mL/100 g), 100 mmol of sulfanilic acid, and 1 L of ion-exchanged high-purity water were mixed using Silverson mixer (6,000 rpm) at room temperature. Subsequently, to an obtained slurry, 100 mmol of nitric acid was added, and after 30 minutes, further sodium nitrite (100 mmol) dissolved in 10 mL of ion-exchanged high-purity water was slowly added to the mixture. Furthermore, the mixture was warmed to 60° C. while stirring, and reacted for 1 hour to obtain a reformed pigment in which sulfanilic acid was added to carbon black. Subsequently, the reformed pigment was adjusted to pH 9 with a 10% tetrabutylammonium hydroxide solution (methanol solution), and after 30 minutes, a modified pigment dispersion was obtained. Subsequently, this dispersion and ion-exchanged high-purity water were subjected to ultrafiltration with a dialysis membrane, and then subjected to ultrasonic dispersion to obtain a surface-reformed black pigment dispersion containing 20% of pigment solid content. A surface treatment level of the pigment was 0.75 mmol/g, and a median diameter $D_{50}$ was 120 nm in accordance with measurement using a particle size distribution measuring apparatus (Nanotrac UPA-EX150 manufactured by Nikkiso Co., Ltd.).

Preparation Example 2

—Preparation of Surface-Reformed Magenta Pigment Dispersion—

1 kg of pigment dispersion SMART Magenta 3122BA manufactured by Sensient Technologies Corporation (Pigment Red 122 surface-treated dispersion, having a pigment solid content of 14.5%) was subjected to acid deposition with 0.1 N HCl aqueous solution. Subsequently, the pigment dispersion was adjusted to pH 9 with 10% tetraethylammonium hydroxide aqueous solution, and after 30 minutes, a reformed pigment dispersion was obtained. The reformed pigment dispersion containing a pigment bonded with at least one aminobenzoic acid group or tetraethylammonium aminobenzoate, and ion-exchanged high-purity water were subjected to ultrafiltration with a dialysis membrane, and then subjected to ultrasonic dispersion to obtain a surface-reformed magenta pigment dispersion containing 20% of pigment solid content. A median diameter $D_{50}$ was 104 nm in accordance with measurement using the particle size distribution measuring apparatus (Nanotrac UPA-EX150 manufactured by Nikkiso Co., Ltd.).

Preparation Example 3

—Preparation of Surface-Reformed Cyan Pigment Dispersion—

1 kg of pigment dispersion SMART Cyan 3154BA manufactured by Sensient Technologies Corporation (Pigment Blue 15:4 surface-treated dispersion, having a pigment solid content of 14.5%) was subjected to acid deposition with 0.1 N HCl aqueous solution. Subsequently, the pigment dispersion was adjusted to pH 9 with 40% benzyltrimethylammonium hydroxide solution (methanol solution), and after 30 minutes, a reformed pigment dispersion was obtained. The reformed pigment dispersion containing a pigment bonded with at least one aminobenzoic acid group or benzyltrimethylammonium aminobenzoate, and ion-exchanged high-purity water were subjected to ultrafiltration with a dialysis membrane, and then subjected to ultrasonic dispersion to obtain a surface-reformed cyan pigment dispersion containing 20% of pigment solid content. A median diameter Dso was 116 nm in accordance with measurement using the particle size distribution measuring apparatus (Nanotrac UPA-EX150 manufactured by Nikkiso Co., Ltd.).

Preparation Example 4

—Preparation of Surface-Reformed Yellow Pigment Dispersion—

1 kg of pigment dispersion SMART Yellow 3074BA manufactured by Sensient Technologies Corporation (Pigment Yellow 74 surface-treated dispersion, having a pigment solid content of 14.5%) was adjusted to pH 9 with 10% tetrabutylammonium hydroxide solution (methanol solution), and after 30 minutes, a reformed pigment dispersion was obtained. The reformed pigment dispersion containing a pigment bonded with at least one aminobenzoic acid group or tetrabutylammonium aminobenzoate, and ion-exchanged high-purity water were subjected to ultrafiltration with a dialysis membrane, and then subjected to ultrasonic dispersion to obtain a surface-reformed yellow pigment dispersion containing 20% of pigment solid content. A median diameter $D_{50}$ was 145 nm in accordance with measurement using the particle size distribution measuring apparatus (Nanotrac UPA-EX150 manufactured by Nikkiso Co., Ltd.).

Preparation Example 5

—Preparation of Magenta Pigment-Containing Polymer Fine Particle Dispersion—
Preparation of Polymer Solution A Inside of a 1 L flask equipped with a mechanical stirrer, a thermometer, a nitrogen gas introduction tube, a reflux pipe, and a drip funnel was sufficiently nitrogen gas-substituted, into which 11.2 g of styrene, 2.8 g of acrylic acid, 12.0 g of lauryl methacrylate, 4.0 g of polyethyleneglycol methacrylate, 4.0 g of styrene macromer, and 0.4 g of mercaptoethanol were mixed, and heated to 65° C.

Subsequently, a mixed solution of 100.8 g of styrene, 25.2 g of acrylic acid, 108.0 g of lauryl methacrylate, 36.0 g of polyethyleneglycol methacrylate, 60.0 g of hydroxyethyl methacrylate, 36.0 g of styrene macromer, 3.6 g of mercaptoethanol, 2.4 g of azobismethylvaleronitrile, and 18 g of methylethylketone was dripped into the flask for 2.5 hours.

After the dripping, a mixed solution of 0.8 g of azobismethylvaleronitrile and 18 g of methylethylketone was dripped into the flask for 0.5 hours. The mixture was matured at 65° C. for 1 hour, then 0.8 g of azobismethylvaleronitrile was added to the mixture, and the mixture was further matured for 1 hour. After completion of the reaction, 364 g of methylethylketone was added to the flask to obtain 800 g of 50% polymer solution A.
Preparation of Pigment-Containing Polymer Fine Particle Dispersion 28 g of the polymer solution A, 42 g of C.I. Pigment Red 122, 13.6 g of a 1 mol/L potassium hydroxide aqueous solution, 20 g of methylethylketone, and 13.6 g of ion-exchanged water were sufficiently stirred, and then kneaded using a roll mill.

An obtained paste was put into 200 g of pure water and thoroughly stirred, from which methylethylketone and water were distilled off using an evaporator, and this dispersion was further pressure-filtered through a polyvinylidene fluoride membrane filter having an average pore size of 5.0 μm to remove coarse particles to obtain a magenta pigment-containing polymer fine particle dispersion containing 15% of pigment and having 20% of solid content.

The median diameter $D_{50}$ of the polymer fine particles in the obtained magenta pigment-containing polymer fine particle dispersion was 127 nm in measurement. Incidentally, the median diameter Dso was measured using the particle size distribution measuring apparatus (Nanotrac UPA-EX150 manufactured by Nikkiso Co., Ltd.).

Preparation Example 6

—Preparation of Cyan Pigment-Containing Polymer Fine Particle Dispersion—

A cyan pigment-containing polymer fine particle dispersion was prepared in the same manner as in Preparation Example 5 except that C.I. Pigment Red 122 as a pigment in Preparation Example 5 was changed to a phthalocyanine pigment (C.I. Pigment Blue 15:3).

The polymer fine particles in the obtained cyan pigment-containing polymer fine particle dispersion had a median diameter $D_{50}$ of 93 nm in accordance with measurement using the particle size distribution measuring apparatus (Nanotrac UPA-EX150 manufactured by Nikkiso Co., Ltd.).

Preparation Example 7

—Preparation of Yellow Pigment-Containing Polymer Fine Particle Dispersion—

A yellow pigment-containing polymer fine particle dispersion was prepared in the same manner as in Preparation Example 5 except that C.I. Pigment Red 122 as a pigment in Preparation Example 5 was changed to a bisazo yellow pigment (C.I. Pigment Yellow 155).

The polymer fine particles in the obtained yellow pigment-containing polymer fine particle dispersion had a median diameter $D_{50}$ of 76 nm in accordance with measurement using the particle size distribution measuring apparatus (Nanotrac UPA-EX150 manufactured by Nikkiso Co., Ltd.).

Preparation Example 8

—Preparation of Carbon Black Pigment-Containing Polymer Fine Particle Dispersion—

A carbon black pigment-containing polymer fine particle dispersion was prepared in the same manner as in Preparation Example 5 except that C.I. Pigment Red 122 as a pigment in Preparation Example 5 was changed to a carbon black (FW100, manufactured by Degussa AG).

The polymer fine particles in the obtained carbon black pigment-containing polymer fine particle dispersion had a median diameter $D_{50}$ of 104 nm in accordance with measurement using the particle size distribution measuring apparatus (Nanotrac UPA-EX150 manufactured by Nikkiso Co., Ltd.).

Preparation Example of Resin Particle
Preparation of Water-Dispersible Polyurethane Resin (A)
Preparation of Polyester Polyol P-1

While introducing nitrogen gas into a reaction vessel equipped with a thermometer, a nitrogen gas introduction tube, and a stirrer, 830 parts of terephthalic acid, 830 parts of isophthalic acid, 374 parts of ethylene glycol, 598 parts of neopentylglycol, and 0.5 part of dibutyltin oxide were put into the reaction vessel, and polycondensed at 230° C. for 15 hours so that an acid value was 1 or lower at 180 to 230° C., to obtain a polyester polyol P-1 having a hydroxyl value of 74.5, an acid value of 0.2, and an average molecular weight of 1,500.

Preparation of Hydrophobic Polyester Polyol Q-1

While introducing nitrogen gas in a reaction vessel equipped with a thermometer, a nitrogen gas introduction tube, and a stirrer, 1,660 parts of orthophthalic acid, 1,637 parts of diethylene glycol, and 0.5 part of dibutyltin oxide were put into the reaction vessel, and polycondensed at 230° C. for 15 hours so that an acid value was 1 or lower at 180 to 230° C., to obtain a polyester polyol Q-1 having a hydroxyl value of 190 and an acid value of 0.3 and having an aromatic ring structure.

Preparation of Water-Dispersible Polyurethane Resin (A)

1,000 parts of polyester polyol P-1 was dehydrated under reduced pressure at 100° C., then cooled to 80° C., to which 907 parts of methylethylketone was added and dissolved by sufficient stirring, and to this mixture, 80 parts of 2,2'-dimethylol propionic acid was added, and subsequently 281 parts of isophorone diisocyanate was added and reacted at 75° C. for 8 hours for conducting urethanization. After confirming that an isocyanate value became 0.1% or lower, the mixture was cooled to 50° C., to which 340 parts of the aforementioned polyester polyol Q-1 was added to prepare a homogeneous solution, and then, to this solution, 60 parts of triethylamine was added for neutralization, and then 7,000 parts of water was added to dissolve the mixture in water. From the obtained transparent reaction product, methylethylketone was removed under reduced pressure at 40 to 60° C., and then, to the reaction product, water was added for density adjustment to obtain a stable semitransparent colloidal aqueous dispersion having 25% of resin solid content.

Preparation of Water-Dispersible Polyurethane Resin (B)

1,000 parts of the aforementioned polyester polyol P-1 was dehydrated under reduced pressure at 100° C., then cooled to 80° C., to which 907 parts of methylethylketone was added and dissolved by sufficient stirring, and to this mixture, 80 parts of 2,2'-dimethylol propionic acid was added, and subsequently 281 parts of isophorone diisocyanate was added and reacted at 75° C. for 8 hours for conducting urethanization. After confirming that an isocyanate value became 0.1% or lower, the mixture was cooled to 50° C., to which 60 parts of triethylamine was added for neutralization, and then 7,000 parts of water was added to dissolve the mixture in water. From the obtained transparent reaction product, methylethylketone was removed under reduced pressure at 40 to 60° C., and then, to the reaction product, water was added for density adjustment to obtain a stable semitransparent colloidal aqueous dispersion having 25% of resin solid content.

Preparation of Water-Dispersible Polyurethane Resin (C)
Preparation of Polyester Polyol P-2

While introducing nitrogen gas in a reaction vessel equipped with a thermometer, a nitrogen gas introduction tube, and a stirrer, 664 parts of terephthalic acid, 631 parts of isophthalic acid, 472 parts of 1,4-butanediol, 447 parts of neopentylglycol, and 0.5 part of dibutyltin oxide were put into the reaction vessel, and esterified at 180 to 230° C. for 5 hours, and then polycondensed at 230° C. for 6 hours until an acid value became 1 or lower. Subsequently, the mixture was cooled to 120° C., to which 321 parts of adipic acid, and 268 parts of 2,2'-dimethylol propionic acid were added. The mixture was heated to 170° C. and reacted again at 170° C. for 20 hours to obtain a polyester polyol P-2 having a carboxyl group and having an acid value of 46.5 and a hydroxyl value of 59.8.

Preparation of Water-Dispersible Polyurethane Resin (C)

1,000 parts of polyester polyol P-2 was dehydrated under reduced pressure at 100° C., then cooled to 80° C., to which 812 parts of methylethylketone was added and dissolved by sufficient stirring, and to this mixture, 20 parts of 1,4-butanediol was added, and subsequently 198 parts of dicyclohexylmethane-4,4'-diisocyanate (hydrogenated methylenediphenyldiisocyanate (MDI)) was added and reacted at 75° C. for 8 hours. After confirming that an isocyanate value became 0.1% or lower, the mixture was cooled to 50° C., to which 84 parts of triethylamine was added for neutralization, and then 7,000 parts of water was added to dissolve the mixture in water. From the obtained transparent reaction product, methylethylketone was removed under reduced pressure at 40 to 60° C., and then, to the reaction product, water was added for density adjustment to obtain a stable semitransparent colloidal aqueous dispersion having 25% of resin solid content.

Preparation of Water-Dispersible Polyurethane Resin (D)

1,000 parts of polyester polyol P-1 was dehydrated under reduced pressure at 100° C., then cooled to 80° C., to which 907 parts of methylethylketone was added and dissolved by sufficient stirring, and to this mixture, 80 parts of 2,2'-dimethylol propionic acid was added, and subsequently 281 parts of isophorone diisocyanate was added and reacted at 75° C. for 8 hours for conducting urethanization. After confirming that an isocyanate value became 0.1% or lower, the mixture was cooled to 50° C., to which 60 parts of triethylamine was added for neutralization, and then 7,000 parts of water was added to dissolve the mixture in water. From the obtained transparent reaction product, methylethylketone was removed under reduced pressure at 40 to 60° C., and then, to the reaction product, water was added for density adjustment to obtain a stable semitransparent colloidal aqueous dispersion having 25% of resin solid content.

Preparation of Acryl-Silicone Polymer Fine Particle A

Inside of a 1 L flask equipped with a mechanical stirrer, a thermometer, a nitrogen gas introduction tube, a reflux pipe, and a drip funnel was sufficiently nitrogen gas-substituted, to which 350 g ofion-exchanged water and 8.0 g of LATEMUL S-180 (reactive anionic surfactant, manufactured by Kao Corporation) were added and mixed, and heated to 65° C. Subsequently, to the mixture, 3.0 g of reaction initiator t-butyl peroxybenzoate and 1.0 g of sodium isoascorbate were added, and after 5 minutes, a mixture of 45 g of methyl methacrylate, 160 g of methacrylic acid-2-ethylhexyl, 5 g of acrylic acid, 45 g of butyl methacrylate, 30 g of cyclohexyl methacrylate, 15 g of vinyltriethoxysilane, 8.0 g of LATEMUL S-180, and 340 g of ion-exchanged water was dripped for 3 hours. Subsequently, the mixture was heated and matured at 80° C. for 2 hours, then cooled to room temperature, and a pH was adjusted to 7 to 8 with sodium hydroxide. Subsequently, ethanol was distilled off by an evaporator, and a water content was adjusted to obtain 730 g of acryl-silicone polymer fine particle A having 40% of solid content. The polymer fine particle in the dispersion had a median diameter $D_{50}$ of 125 nm in accordance with measurement using a particle size distribution measuring apparatus (Nanotrac UPA-EX150, manufactured by Nikkiso Co., Ltd.).

Pre-Ink Production Example
Pre-Ink Production Example 1

Into a container equipped with a stirrer, 7.50 parts of 3-methoxy-N,N-dimethylpropanamide represented by formula (I), 5.00 parts of propyleneglycol monopropyl ether, 18.00 parts of propylene glycol, 2.00 parts of 2,2,4-trimethyl-1,3-pentanediol, 0.50 part of 2,4,7,9-tetramethyldecane-4,7-diol, and 1 part of polyether-modified siloxane compound represented by formula (8) were put, and mixed and stirred for 30 minutes. Subsequently, 0.05 part of antiseptic and antifungal agent (Proxel GXL, manufactured by Avecia Biotechnology Inc.), 0.30 part of 2-amino-2-ethyl-1,3-propanediol, 56 parts of prepared water-dispersible polyurethane resin (A), 1.62 part of polyurethane dispersion (Takelac W-6110, manufactured by Mitsui Chemicals, Incorporated), and high-purity water in such an amount that the total amount was 100 parts were added to the mixture, and mixed and stirred for 60 minutes. Subsequently, the obtained mixture was pressure-filtered through a polyvinylidene fluoride membrane filter having an average pore size of 1.2 μm to remove coarse particles and dusts to obtain a pre-ink 1.

Pre-Ink Production Example 2

Into a container equipped with a stirrer, 7.50 parts of 3-methoxy-N,N-dimethylpropanamide represented by formula (I), 5.00 parts of propyleneglycol monopropyl ether, 22.00 parts of propylene glycol, 2.00 parts of 2-ethyl-1,3-hexanediol, 0.50 part of 2,4,7,9-tetramethyldecane-4,7-diol, and 1.50 part of polyether-modified siloxane compound represented by formula (8) were put, and mixed and stirred for 30 minutes. Subsequently, 0.05 part of antiseptic and antifungal agent (Proxel GXL, manufactured by Avecia Biotechnology Inc.), 0.30 part of 2-amino-2-ethyl-1,3-propanediol, 24.00 parts of prepared water-dispersible polyurethane resin (A), 1.62 part of polyurethane dispersion (Takelac W-6110, manufactured by Mitsui Chemicals, Incorporated), 15.00 parts of the surface-reformed black pigment dispersion in Preparation Example 1, and high-purity water in such an amount that the total amount was 100 parts were added to the mixture, and mixed and stirred for 60 minutes. Subsequently, the obtained mixture was pressure-filtered through a polyvinylidene fluoride membrane filter having an average pore size of 1.2 μm to remove coarse particles and dusts to obtain a pre-ink 2.

Pre-Ink Production Examples 3 to 18

In the same manner as in Pre-Ink Production Example 1 and Pre-Ink Production Example 2, an organic solvent, a surfactant and an antifoaming agent presented in each column of Pre-Ink Production Examples 3 to 18 in the following Table 1-1 and Table 1-2 were mixed and stirred, to which an antiseptic and antifungal agent, a pH conditioner and a colorant (pigment dispersion) were mixed and stirred, and furthermore a water-dispersible polyurethane resin and resin particles were mixed and stirred. The obtained mixture was pressure-filtered through a polyvinylidene fluoride membrane filter having an average pore size of 1.2 μm to remove coarse particles and dusts to obtain pre-inks 3 to 18.

TABLE 1-1

| | Component (% by mass) | Pre-ink 1 | 2 | 3 | 4 | 5 | 6 | 7 | 8 | 9 |
|---|---|---|---|---|---|---|---|---|---|---|
| Colorant | Surface-reformed black pigment dispersion (Preparation Example 1) | — | — | — | — | — | — | — | — | — |
| | Surface-reformed magenta pigment dispersion (Preparation Example 2) | — | 15.00 | — | — | — | — | — | — | — |
| | Surface-reformed cyan pigment dispersion (Preparation Example 3) | — | — | 12.50 | — | — | — | — | — | — |
| | Surface-reformed yellow pigment dispersion (Preparation Example 4) | — | — | — | 10.00 | — | — | — | — | — |
| | Magenta pigment-containing polymer fine particle dispersion (Preparation Example 5) | — | — | — | — | 12.50 | — | — | — | — |
| | Cyan pigment-containing polymer fine particle dispersion (Preparation Example 6) | — | — | — | — | — | 20.00 | — | — | — |
| | Yellow pigment-containing polymer fine particle dispersion (Preparation Example 7) | — | — | — | — | — | — | 16.67 | 16.67 | — |
| | Carbon black pigment-containing polymer fine particle dispersion (Preparation Example 8) | — | — | — | — | — | — | — | — | 20.00 |
| | Direct Blue 199 (water-dispersible cyan dye) | 56.00 | — | — | — | — | — | — | — | — |
| Polyurethane resin particle | Water-dispersible polyurethane resin (A) | — | 24.00 | 30.00 | — | — | 32.00 | 21.00 | — | — |
| | Water-dispersible polyurethane resin (B) | — | — | — | 40.00 | — | — | — | 34.00 | — |
| | Water-dispersible polyurethane resin (C) | — | — | — | — | 30.00 | — | — | — | 26.00 |
| | Water-dispersible polyurethane resin (D) | — | — | — | — | — | — | — | — | — |
| Polyurethane resin particle having structure represented by general formula (I) | Polyurethane dispersion "SUPERFLEX 300" | 1.62 | 1.62 | 1.67 | 1.00 | 3.23 | 1.62 | 1.62 | 1.67 | 1.62 |
| | Polyurethane dispersion "Takelac W-6110" | — | — | — | — | — | — | 3.75 | — | 2.10 |
| Resin particle | Acryl-silicone polymer fine particle A | 7.50 | 7.50 | 5.00 | 5.00 | — | — | 10.00 | 8.00 | 7.50 |
| Organic solvent | Formula (1) 3-methoxy-N,N-dimethylpropaneamide (SP value: 9.19) | — | — | 3.00 | — | — | 3.00 | — | — | — |
| | Formula (2) 3-5-butoxy-N,N-dimethylpropaneamde (SP value: 9.03) | — | — | — | — | — | 5.00 | — | 1.00 | 2.50 |
| | Formula (5) 3-ethyl-3-hydroxymethyloxetane (SP value: 11.31) | — | — | 2.00 | — | — | — | — | — | — |
| | Formula (6) 3-methyl-3-hydroxymethyloxetane (SP value: 11.79) | — | — | — | 3.00 | — | — | — | — | — |
| | Propyleneglycol monopropyl ether (100° C. vapor pressure: 76 mmHg) | 5.00 | 5.00 | — | — | — | — | — | — | 3.00 |
| | Propyleneglycol monobutyl ether (100° C. vapor pressure: 59 mmHg) | — | — | 2.00 | — | — | — | — | — | — |
| | 3-methoxy-1-butanol (100° C. vapor pressure: 76 mmHg) | — | — | — | — | — | 3.00 | 4.00 | 6.00 | — |
| | 3-methoxy-3-methyl-butanol (100° C. vapor pressure: 50 mmHg) | — | — | — | — | — | — | — | — | — |
| | Glycerol (SP value: 16.38) | 18.00 | 22.00 | 5.00 | — | 3.00 | — | — | — | — |
| | Propylene glycol (SP value: 13.72) | — | — | 15.00 | 22.00 | 30.00 | 20.00 | 20.00 | 18.00 | 20.00 |
| | 2-ethyl-1,3-hexanediol (SP value: 10.6) | — | 2.00 | 2.00 | 2.00 | — | 2.00 | 2.00 | 1.00 | 2.00 |
| | 2,2,4-trimethyl-1,3-pentanediol (SP value: 10.8) | 2.00 | — | — | — | 2.00 | — | — | — | — |
| Surfactant | Formula (8) Polyether-modified siloxane compound | — | 1.50 | 1.00 | 2.00 | — | — | — | — | — |
| | Formula (10) Polyether-modified siloxane compound | 1.00 | — | — | — | 2.00 | 2.00 | — | 1.00 | — |
| | Formula (11) Polyether-modified siloxane compound | — | — | — | — | — | — | — | — | — |
| | TEGO Wet 270 | — | — | — | — | — | — | — | — | — |

TABLE 1-1-continued

| | | Pre-ink | | | | | | | | |
|---|---|---|---|---|---|---|---|---|---|---|
| | Component (% by mass) | 1 | 2 | 3 | 4 | 5 | 6 | 7 | 8 | 9 |
| Antifungal agent | SILFACE SAG503A | — | — | — | — | — | — | 1.00 | 1.00 | — |
| Foam inhibitor (antifoaming agent) | UNIDYNE DSN403N | 0.05 | 0.05 | 0.05 | 0.05 | 0.05 | 0.05 | 0.05 | 0.05 | 0.20 |
| | Proxel GXL | 0.50 | 0.50 | 0.50 | 0.50 | — | — | — | — | 0.05 |
| | 2,4,7,9-tetramethyldecane-4,7-diol | — | — | — | — | 0.40 | 0.40 | 0.40 | 0.40 | 0.80 |
| | 2,5,8,11-tetramethyldodecane-5,8-diol | 0.30 | 0.30 | — | 0.10 | 0.40 | 0.20 | — | 0.30 | — |
| | 2-amino-2-ethyl-1,3-propanediol | — | — | — | 0.24 | — | — | — | — | 0.20 |
| | 20% potassium hydroxide aqueous solution | — | — | 0.17 | — | — | — | — | — | — |
| pH conditioner | 20% sodium hydroxide aqueous solution | — | — | — | — | — | 0.02 | — | — | 0.02 |
| | Pure water | Filling-up amount | Filling-up amount | Filling-up amount | Filling-up amount | Filling-up amount | Filling-up amount | Filling-up amount | Filling-up amount | Filling-up amount |
| | Total (% by mass) | 100 | 100 | 100 | 100 | 100 | 100 | 100 | 100 | 100 |

TABLE 1-2

| | Component (% by mass) | Pre-ink | | | | | | | | |
|---|---|---|---|---|---|---|---|---|---|---|
| | | 10 | 11 | 12 | 13 | 14 | 15 | 16 | 17 | 18 |
| Colorant | Surface-reformed black pigment dispersion (Preparation Example 1) | — | — | — | — | — | — | — | — | 15.00 |
| | Surface-reformed magenta pigment dispersion (Preparation Example 2) | — | — | — | — | — | — | — | — | — |
| | Surface-reformed cyan pigment dispersion (Preparation Example 3) | — | — | — | — | — | — | — | — | — |
| | Surface-reformed yellow pigment dispersion (Preparation Example 4) | — | — | — | — | — | — | — | — | — |
| | Magenta pigment-containing polymer fine particle dispersion (Preparation Example 5) | — | — | 6.67 | — | — | — | — | — | — |
| | Cyan pigment containing polymer fine particle dispersion (Preparation Example 6) | — | — | — | — | — | 10.00 | — | — | — |
| | Yellow pigment-containing polymer fine particle dispersion (Preparation Example 7) | — | — | — | 7.33 | — | — | — | — | — |
| | Carbon black pigment containing polymer fine particle dispersion (Preparation Example 8) | 20.00 | 20.00 | — | — | 16.67 | — | 3.00 | — | — |
| | Direct Blue 199 (water-dispersible cyan dye) | — | — | — | — | — | — | — | — | — |
| | Water dispersible polyurethane resin (A) | 11.20 | — | 40.00 | — | — | — | 24.00 | 56.00 | 24.00 |
| | Water-dispersible polyurethane resin (B) | — | 20.00 | — | — | — | — | — | — | — |
| | Water-dispersible polyurethane resin (C) | — | — | — | 45.71 | — | — | — | — | — |
| Polyurethane resin particle having structure represented by general formula (I) | Water-dispersible polyurethane resin (D) | — | — | — | — | 24.27 | 32.00 | — | — | — |
| Resin particle | Polyurethane dispersion "SUPERFLEX 300" | 16.67 | 1.67 | 1.62 | 1.62 | — | 1.67 | 1.67 | 1.62 | 1.62 |
| | Polyurethane dispersion "Takelac W-6110" | — | — | — | — | — | — | — | — | — |
| | Acryl-silicone polymer fine particle A | — | — | — | — | — | — | — | — | — |
| Organic solvent | Formula (1) 3-methoxy-N,N-dimethylpropaneamide (SP value: 9.19) | 5.00 | 5.00 | 5.00 | 5.00 | 5.00 | 5.00 | 5.00 | 7.50 | 7.50 |
| | Formula (2) 3-n-butoxy-N,N-dimethylpropaneamide (SP value: 9.03) | — | — | — | — | — | — | — | — | — |
| | Formula (5) 3-ethyl-3-hydroxymethyloxetane (SP value: 11.31) | 3.00 | 3.00 | 3.00 | 3.00 | 3.00 | 3.00 | 3.00 | — | — |
| | Formula (6) 3-methyl-3-hydroxymethyloxetane (SP value: 11.79) | — | 5.00 | — | 2.00 | — | — | — | 5.00 | 5.00 |
| | Propyleneglycol monopropyl ether (100° C. vapor pressure: 76 mmHg) | — | — | 5.00 | — | — | 5.00 | 2.00 | — | — |
| | Propyleneglycol monobutyl ether (100° C. vapor pressure: 59 mmHg) | 3.00 | — | — | — | — | — | — | — | — |
| | 3-methoxy-1-butanol (100° C. vapor pressure: 76 mmHg) | — | — | — | — | — | — | — | — | — |
| | 3-methoxy-3-methyl-butanol (100° C. vapor pressure: 50 mmHg) | 2.00 | — | — | — | 5.00 | — | 2.00 | — | — |
| | Glycerol (SP value: 16.38) | — | 4.00 | — | 2.00 | — | 2.00 | 5.00 | — | — |
| | Propylene glycol (SP value: 13.72) | 20.00 | 20.00 | 18.00 | 15.00 | 20.00 | 18.00 | 25.00 | 18.00 | 22.00 |
| | 2-ethyl-1,3-hexanediol (SP value: 10.6) | 2.00 | 2.00 | 2.00 | 2.00 | 2.00 | 2.00 | 2.00 | — | 2.00 |
| | 2,2,4-trimethyl-1,3-pentanediol (SP value: 10.8) | — | — | — | — | — | — | — | 2.00 | — |
| Surfactant | Formula (10) Polyether-modified siloxane compound | 2.00 | — | 3.00 | — | — | — | 2.00 | — | — |
| | Formula (11) Polyether-modified siloxane compound | — | 3.00 | — | — | — | — | — | — | — |
| | TEGO Wet 270 | — | — | — | — | 2.00 | 2.00 | — | — | — |

TABLE 1-2-continued

| Component (% by mass) | | Pre-ink | | | | | | | | |
|---|---|---|---|---|---|---|---|---|---|---|
| | | 10 | 11 | 12 | 13 | 14 | 15 | 16 | 17 | 18 |
| Antifungal agent | SILFACE SAG503A | — | — | — | 2.00 | — | — | — | — | — |
| Foam inhibitor (antifoaming agent) | UNIDYNE DSN403N | — | — | — | — | — | — | — | 1.00 | 1.50 |
| | Proxel GXL | 0.05 | 0.05 | 0.05 | 0.05 | 0.05 | 0.05 | 0.05 | 0.05 | 0.05 |
| | 2,4,7,9-tetramethyldecane-4,7-diol | 0.40 | 0.40 | 0.40 | 0.40 | — | — | 0.40 | 0.50 | 0.50 |
| | 2,5,8,11-tetramethyldodecane-5,8-diol | — | — | — | — | 0.40 | 0.40 | — | — | — |
| | 2-amino-2-ethyl-1,3-propanediol | 0.30 | 0.30 | 0.30 | 0.30 | 0.30 | 0.30 | 0.20 | 0.30 | 0.30 |
| pH conditioner | 20% potassium hydroxide aqueous solution | 0.03 | — | 0.03 | — | — | — | — | — | — |
| | 20% sodium hydroxide aqueous solution | — | — | — | — | — | — | — | — | — |
| | Pure water | Filling-up amount | Filling-up amount | Filling-up amount | Filling-up amount | Filling-up amount | Filling-up amount | Filling-up amount | Filling-up amount | Filling-up amount |
| Total (% by mass) | | 100 | 100 | 100 | 100 | 100 | 100 | 100 | 100 | 100 |

Details of abbreviations and the like in Table 1-1 and Table 1-2 are as follows.

Direct Blue 199 (water-soluble cyan dye): manufactured by Ekta International

SUPERFLEX 300: polyurethane dispersion, solid content: 30.0%, Tg-=−42° C., manufactured by DKS Co. Ltd.)

Takelac W-6110: polyurethane dispersion, solid content 30.9%, Tg=−20° C., manufactured by Mitsui Chemicals, Incorporated)

Compound represented by formula (I): 3-methoxy-N,N-dimethylpropanamide

Compound represented by formula (2): 3-n-butoxy-N,N-dimethylpropananmide

Compound represented by formula (5): 3-ethyl-3-hydroxymethyloxcetane

Compound represented by formula (6): 3-methyl-3-hydroxymethyloxcetane

TEGO Wet270: polyether-modified siloxane compound (manufactured by Evonik Industries AG, active ingredient: 100%)

SILFACE SAG503A: polyether-modified siloxane compound (manufactured by Nissin Chemical co., ltd., active ingredient: 100%)

Unidyne DSN403N: polyoxyethylene perfluoroalkyl ether (manufactured by DAIKIN INDUSTRIES, LTD., active ingredient: 100%)

Proxel GXL: antiseptic and antifungal agent containing 1,2-benzisothiazolin-3-one as a main ingredient (manufactured by Avecia Biotechnology Inc., ingredient: 20%, containing dipropyleneglycol)

The physical properties of each ink in Pre-Ink Production Examples 1 to 18 were measured as follows. Table 2 presents the results.

Viscosity

A Viscosity was measured using a viscometer (RE-85L, manufactured by TOKI SANGYO CO., LTD.) at 25° C.

pH

A pH was measured using a pH meter (type HM-30R, manufactured by DKK-TOA CORPORATION) at 25° C.

Static Surface Tension

A static surface tension was measured using an automatic surface tensiometer (DY-300, manufactured by Kyowa Interface Science Co., Ltd.) at 25° C.

Dynamic Surface Tension

A dynamic surface tension of the ink according to an embodiment of the present invention was measured with a surface life of 15 msec in accordance with the maximum bubble pressure method using SITA DynoTester (manufactured by SITA Messtechnik GmbH) at 25° C.

TABLE 2

| Pre-ink | Polyurethane resin particle solid content (%) | Solid content ratio of polyurethane resin particle/ colorant | Viscosity (mPa·s) | pH | Static surface tension (mN/m) | 15 msec dynamic surface tension (mN/m) |
|---|---|---|---|---|---|---|
| Pre-ink 1 | 14.5 | — | 10.20 | 8.70 | 21.5 | 32.7 |
| Pre-ink 2 | 6.5 | 2.2 | 9.40 | 8.75 | 20.9 | 31.8 |
| Pre-ink 3 | 8.0 | 3.2 | 9.50 | 9.20 | 21.3 | 32.2 |
| Pre-ink 4 | 10.3 | 5.2 | 9.20 | 9.50 | 20.6 | 31.3 |
| Pre-ink 5 | 8.5 | 3.4 | 9.10 | 8.90 | 20.5 | 30.6 |
| Pre-ink 6 | 8.5 | 2.8 | 9.47 | 9.00 | 20.7 | 30.9 |
| Pre-ink 7 | 6.5 | 2.6 | 9.30 | 8.20 | 21.4 | 32.3 |
| Pre-ink 8 | 9.0 | 3.6 | 9.60 | 8.80 | 20.4 | 30.3 |
| Pre-ink 9 | 7.0 | 2.3 | 9.40 | 9.05 | 22.5 | 33.0 |
| Pre-ink 10 | 7.8 | 2.6 | 8.90 | 9.16 | 20.3 | 30.1 |
| Pre-ink 11 | 5.5 | 1.8 | 9.20 | 8.87 | 20.1 | 29.9 |
| Pre-ink 12 | 10.5 | 10.5 | 9.08 | 9.40 | 20.1 | 29.8 |
| Pre-ink 13 | 11.9 | 10.8 | 9.70 | 8.90 | 20.6 | 30.9 |
| Pre-ink 14 | 7.5 | 3.0 | 8.56 | 8.80 | 20.8 | 31.2 |
| Pre-ink 15 | 8.5 | 5.7 | 9.40 | 8.70 | 20.7 | 31.1 |
| Pre-ink 16 | 6.5 | 2.2 | 8.84 | 8.60 | 20.9 | 31.6 |
| Pre-ink 17 | 14.5 | — | 10.20 | 8.70 | 19.5 | 29.6 |
| Pre-ink 18 | 6.5 | 2.2 | 9.40 | 8.75 | 19.1 | 29.4 |

Ink Production Example

The pre-ink was warmed under conditions presented in Table 3 to obtain Inks 1 to 18. Physical properties of each ink were measured in the same manner as for the pre-inks.

Table 3 presents the results.

TABLE 3

| Ink | Pre-ink | Temperature and time for warming ink | Polyurethane resin particle solid content (%) | Solid content ratio of polyurethane resin particle/ colorant | Viscosity (mPa·s) | pH | Static surface tension (mN/m) | 15 msec dynamic surface tension (mN/m) |
|---|---|---|---|---|---|---|---|---|
| Ink 1 | Pre-ink 1 | 50° C., 2 weeks | 14.5 | — | 10.21 | 8.69 | 21.5 | 32.7 |
| Ink 2 | Pre-ink 1 | 60° C., 48 hours | 14.5 | — | 10.14 | 8.42 | 21.3 | 32.5 |
| Ink 3 | Pre-ink 2 | 65° C., 8 hours | 6.5 | 2.2 | 9.42 | 8.72 | 21.0 | 31.9 |

TABLE 3-continued

| Ink | Pre-ink | Temperature and time for warming ink | Polyurethane resin particle solid content (%) | Solid content ratio of polyurethane resin particle/colorant | Viscosity (mPa·s) | pH | Static surface tension (mN/m) | 15 msec dynamic surface tension (mN/m) |
|---|---|---|---|---|---|---|---|---|
| Ink 4  | Pre-ink 3  | 40° C., 1 month   | 8.0  | 3.2  | 9.50 | 9.19 | 21.3 | 32.2 |
| Ink 5  | Pre-ink 4  | 60° C., 24 hours  | 10.3 | 5.2  | 9.18 | 9.46 | 20.5 | 31.4 |
| Ink 6  | Pre-ink 5  | 55° C., 24 hours  | 8.5  | 3.4  | 9.11 | 8.84 | 20.5 | 30.6 |
| Ink 7  | Pre-ink 6  | 68° C., 6 hours   | 8.5  | 2.8  | 9.48 | 9.00 | 20.7 | 30.9 |
| Ink 8  | Pre-ink 7  | 45° C., 1 month   | 6.5  | 2.6  | 9.26 | 8.12 | 21.3 | 32.1 |
| Ink 9  | Pre-ink 8  | 65° C., 12 hours  | 9.0  | 3.6  | 9.61 | 8.74 | 20.4 | 30.3 |
| Ink 10 | Pre-ink 9  | 60° C., 24 hours  | 7.0  | 2.3  | 9.41 | 9.04 | 22.5 | 33.0 |
| Ink 11 | Pre-ink 10 | 60° C., 24 hours  | 7.8  | 2.6  | 8.91 | 9.15 | 20.3 | 30.1 |
| Ink 12 | Pre-ink 11 | 60° C., 24 hours  | 5.5  | 1.8  | 9.22 | 8.84 | 20.2 | 29.9 |
| Ink 13 | Pre-ink 12 | 60° C., 16 hours  | 10.5 | 10.5 | 9.05 | 9.38 | 20.1 | 29.8 |
| Ink 14 | Pre-ink 13 | 65° C., 12 hours  | 11.9 | 10.8 | 9.70 | 8.83 | 20.6 | 30.9 |
| Ink 15 | Pre-ink 15 | 60° C., 12 hours  | 8.5  | 5.7  | 9.39 | 8.68 | 20.7 | 31.1 |
| Ink 16 | Pre-ink 16 | 60° C., 16 hours  | 6.5  | 2.2  | 8.85 | 8.58 | 20.9 | 31.6 |
| Ink 17 | Pre-ink 12 | 50° C., 36 hours  | 10.5 | 10.5 | 9.07 | 9.41 | 20.1 | 29.8 |
| Ink 18 | Pre-ink 12 | 38° C., 1 month   | 10.5 | 10.5 | 9.06 | 9.39 | 20.1 | 29.8 |

Each of the pre-inks and the inks warmed under each condition was charged into an ink pack, and the ink which had been stored under a room temperature environment (25±5° C.) for a month was evaluated in a manner as described below, and an image was formed and evaluated for properties. Table 4 presents the results.

—Quantification of Cyclic Ester Crystal Having Structure Represented by General Formula (1) Contained in Ink—

Quantification Method

In quantification of the cyclic ester crystals having the structure represented by general formula (I) contained in the ink composition, simply each ink of Production Examples was filtered using a filter fixture in which Filter Paper for KIRIYAMA ROHTO a diameter of 60 mm No. 5C (particle holding capacity: 1 μm) was set to a diameter of 60 mm KIRIYAMA ROHTO, and crystals held after filtration and the filter paper were thoroughly washed with high-purity water and then dried to the water content of the filter paper before filtration. A weight of the filter paper before filtration and a total weight of the crystals held after filtration and the filter paper were measured, and a difference between before and after the filtration was determined to quantify cyclic ester crystals having a structure represented by the following structural formula B.

Herein, in relation to the amount of the ink to be filtered, 3,000 g of ink was filtered and quantified for improving quantification accuracy.

The crystals on the filter paper were dissolved with tetrahydrofuran, the filter paper was dried and weighed, and a difference between before and after the filtration was defined as the amount of the crystals. In addition, the solution dissolved in tetrahydrofuran was analyzed by LC-MS analysis to confirm whether other components were contained. The structure of the crystals which had been precipitated in the ink and obtained through precipitation was qualitatively analyzed by GC-MS analysis and LC-MS analysis+$C^{-}$-NMR+$H^1$-NMR+FT-IR, and as a result, it was confirmed that all the crystals were a cyclic ester having a structure represented by the following structural formula A-1.

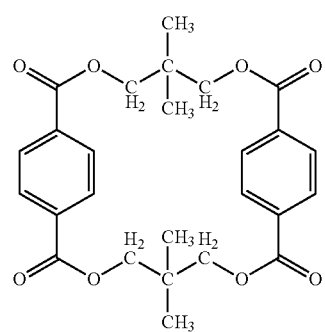

structural formula A-1

Preparation of Pretreatment Liquid

Each pretreatment liquid was produced in accordance with the following procedure.

Pretreatment Liquid 1

5.56 parts of calcium acetate monohydrate was weighed out into a glass beaker, to which 30.00 parts of high-purity water was added, and then stirred for 5 minutes. Subsequently, to this solution, 15.00 parts of propyleneglycol, 5.00 parts of glycerol, 1.50 part of 2-ethyl-1,3-hexanediol, 0.25 part of TEGOWet270, 0.075 part of Proxel GXL, and 0.05 part of 1,2,3-benzotriazole were added, and then mixed and stirred for 15 minutes. Furthermore, to this mixture, high-purity water was added so that the total amount was 100 parts, and mixed and stirred for 10 minutes.

This mixture was pressure-filtered through a polyvinylidene fluoride membrane filter having an average pore size of 5.0 μm to remove dusts such as insoluble matters to prepare pretreatment liquid 1.

Pretreatment Liquid 2

7.14 parts of DL-calcium lactate was weighed out into a glass beaker, to which 30.00 parts of high-purity water was added, and then stirred for 5 minutes. Subsequently, to this solution, 10.00 parts of 1,3-butanediol, 7.50 parts of glycerol, 1.50 part of 2-ethyl-1,3-hexanediol, 1.00 part of EMULGEN LS-106.0.075 part of Proxel GXL, and 0.05 part of 1,2,3-benzotriazole were added, and mixed and stirred for 15 minutes. Furthermore, to this mixture, 33.33 parts of polyolefin resin particle A was added, and then high-purity water was added so that the total amount was 100 parts, and mixed and stirred for 10 minutes.

This mixture was pressure-filtered through a polyvinylidene fluoride membrane filter having an average pore size of 5.0 μm to remove dusts such as insoluble matters to prepare pretreatment liquid 2.

Pretreatment Liquid 3 to 12

Pretreatment liquids 3 to 12 were prepared in the same manner as in the preparation of pretreatment liquid 1 except that each component in the preparation of pretreatment liquid 1 was blended in accordance with formulations presented in Table 4.

TABLE 4

| Component (% by mass) | | Pre-treatment liquid 1 | Pre-treatment liquid 2 | Pre-treatment liquid 3 | Pre-treatment liquid 4 | Pre-treatment liquid 5 | Pre-treatment liquid 6 | Pre-treatment liquid 7 | Pre-treatment liquid 8 | Pre-treatment liquid 9 | Pre-treatment liquid 10 | Pre-treatment liquid 11 | Pre-treatment liquid 12 |
|---|---|---|---|---|---|---|---|---|---|---|---|---|---|
| Nonionic resin particle | Polyolefine resin particle A | — | 33.33 | — | — | — | — | — | — | — | — | — | — |
| | Polyolefine resin particle B | — | — | 25.00 | — | — | — | — | — | — | — | — | — |
| | Ethylene-vinyl acetate resin particle A | — | — | — | 20.00 | — | — | — | — | — | — | — | — |
| | Ethylene-vinyl acetate resin particle B | — | — | — | — | 13.64 | — | — | — | — | — | — | — |
| | Ethylene-vinyl acetate-vinyl chloride copolymer resin particle A | — | — | — | — | — | 15.00 | — | — | — | — | — | — |
| | Vinyl acetate-acrylic resin particle A | — | — | — | — | — | — | 22.22 | — | — | — | — | — |
| | Urethane resin particle A | — | — | — | — | — | — | — | 30.00 | — | — | — | — |
| | Styrene-butadiene resin particle A | — | — | — | — | — | — | — | — | 24.49 | — | — | — |
| | Polyester resin particle A | — | — | — | — | — | — | — | — | — | 20.00 | — | — |
| | Acrylic resin particle A | — | — | — | — | — | — | — | — | — | — | 25.00 | — |
| | | — | — | — | — | — | — | — | — | — | — | — | 30.33 |
| Organic acid metal salt | Calcium acetate monohydrate | 5.56 | — | — | — | — | — | — | — | — | — | — | — |
| | DL-calcium lactate | — | 7.14 | — | — | — | — | — | — | — | — | — | — |
| | Calcium tartrate tetrahydrate | — | — | 5.56 | 5.56 | 0.10 | — | — | — | — | — | — | — |
| Inorganic acid metal salt | Magnesium sulfate | — | — | — | — | 5.26 | 7.90 | — | — | — | — | — | — |
| | Calcium chloride dihydrate | — | — | — | — | — | — | — | — | — | — | — | — |
| Organic acid ammonium salt | Ammonium lactate aqueous solution (content: 66%) | — | — | — | — | — | — | 5.26 | 15.15 | 10.53 | — | — | — |
| | Ammonium acetate (content: 95%) | — | — | — | — | — | — | — | — | — | — | — | — |
| Organic solvent | 1,3-butanediol (SP value: 13.78) | 15.00 | 10.00 | 15.00 | 7.50 | 5.00 | 15.00 | 10.00 | 15.00 | 15.00 | 5.00 | 5.00 | 10.00 |
| | Propyleneglycol (SP value: 13.72) | 5.00 | 7.50 | 5.00 | 7.50 | 15.00 | 5.00 | 5.00 | 5.00 | 5.00 | 12.50 | 12.50 | 7.50 |
| | Glycerol (SP value: 16.38) | 5.00 | 5.00 | 5.00 | 5.00 | 5.00 | 5.00 | 5.00 | 5.00 | 5.00 | 5.00 | 5.00 | 1.50 |
| Wetting agent | 2-ethyl-1,3-hexanediol | 1.50 | 1.50 | 1.50 | 1.50 | 1.50 | 1.50 | 1.50 | 1.50 | 1.50 | 1.50 | 1.50 | 1.00 |
| Penetrant | EMULGEN LS-106 | — | 1.00 | — | — | 1.00 | — | 1.25 | — | 0.50 | — | — | — |
| Surfactant | TEGO Wet 270 | 0.25 | — | 0.25 | 0.10 | — | 0.25 | — | 0.10 | 0.10 | 0.15 | 0.10 | — |
| | Unidyne DSN403N | — | — | — | — | — | — | — | — | — | 0.05 | — | — |
| Antifungal agent | Proxel GXL | 0.075 | 0.075 | 0.075 | 0.075 | 0.075 | 0.075 | 0.075 | 0.075 | 0.075 | 0.075 | 0.075 | 0.075 |
| Antirust agent | 1,2,3-benzotriazole | 0.05 | 0.05 | 0.05 | 0.05 | 0.05 | 0.05 | 0.05 | 0.05 | 0.05 | 0.05 | 0.05 | 0.05 |
| | High-purity water | Filling-up amount | Filling-up amount | Filling-up amount | Filling-up amount | Filling-up amount | Filling-up amount | Filling-up amount | Filling-up amount | Filling-up amount | Filling-up amount | Filling-up amount | Filling-up amount |
| Total (% by mass) | | 100 | 100 | 100 | 100 | 100 | 100 | 100 | 100 | 100 | 100 | 100 | 100 |

Abbreviations and the like in Table 4 are as follows.

* Polyolefin resin particle A: nonionic chlorinated polyolefin resin, SUPERCHLON E-480T (solid content: 30%), manufactured by NIPPON PAPER INDUSTRIES CO LTD., softening point: 70° C.
* Polyolefin resin particle B: nonionic chlorinated polyolefin resin, SUPERCHLON E-415 (solid content: 30%), manufactured by NIPPON PAPER INDUSTRIES CO., LTD., softening point: 85° C.
* Ethylene-vinyl acetate resin particle A: nonionic ethylene-vinyl acetate copolymer resin, SUMIKAFLEX 408HQ (solid content: 50%) manufactured by Sumika Chemtex Company, Limited, Tg: −30° C.
* Ethylene-vinyl acetate resin particle B: nonionic ethylene-vinyl acetate copolymer resin, SUMIKAFLEX 401HQ (solid content: 55%) manufactured by Sumika Chemtex Company, Limited, Tg: −18° C.
* Ethylene-vinyl acetate-vinyl chloride copolymer resin particle A: nonionic ethylene-vinyl acetate copolymer resin, SUMIKAFLEX 830 (solid content: 50%) manufactured by Sumika Chemtex Company, Limited, Tg: 20° C.
* Vinyl acetate-acryl resin particle A: nonionic vinyl acetate-acryl copolymer resin, VINYBLAN 1225 (solid content: 45%) manufactured by Nissin Chemical co., ltd., Tg: 9° C.
* Urethane resin particle A: nonionic polyether-based urethane resin, UCOAT UX-2510 (solid content: 50%), manufactured by SANYO CHEMICAL INDUSTRIES, LTD., softening point: 150° C.
* Styrene-butadiene resin particle A: nonionic styrene-butadiene copolymer resin, NALSTAR SR-130 (solid content: 49%), manufactured by NIPPON A&L INC, Tg: −1° C.
* Polyester resin particle A: nonionic polyester resin, PESRESIN A-160P (solid content: 25%), manufactured by TAKAMATSU OIL & FAT CO., LTD., Tg: −30° C.
* Acrylic resin particle A: nonionic acrylic resin, VINYBLAN 2680 (solid content: 30%), manufactured by Nissin Chemical co., ltd, Tg: 8° C.
* Calcium acetate monohydrate: JUNSEI CHEMICAL CO., LTD., purity: 98% or higher
* DL-calcium lactate: Musashino Chemical Laboratory, Ltd., purity: 97% or higher TABLE 4-continued

| Component (% by mass) | Pre-treatment liquid 1 | Pre-treatment liquid 2 | Pre-treatment liquid 3 | Pre-treatment liquid 4 | Pre-treatment liquid 5 | Pre-treatment liquid 6 | Pre-treatment liquid 7 | Pre-treatment liquid 8 | Pre-treatment liquid 9 | Pre-treatment liquid 10 | Pre-treatment liquid 11 | Pre-treatment liquid 12 |
|---|---|---|---|---|---|---|---|---|---|---|---|---|

* Calcium tartrate tetrahydrate: FUJIFILM Wako Pure Chemical Corporation, purity: 97% or higher
* Magnesium Sulfate: JUNSEI CHEMICAL CO., LTD., purity: 99.5% or higher
* Calcium chloride dihydrate: Tokuyama Corporation, purity: 98% or higher
* Ammonium lactate aqueous solution (content: 66%); Musashino Chemical Laboratory, Ltd.
* Ammonium acetate (content: 95%); FUJIFILM Wako Pure Chemical Corporation
* EMULGEN LS-106: Polyoxyalkylenealkyl ether (manufactured by Kao Corporation, active ingredient: 100%, hydrophile-lipophile balance (HLB): 12.5)
* TEGO Wet 270: polyether-modified siloxane compound (manufactured by Evonik Industries AG, active ingredient: 100%)
* Unidyne DSN403N: polyoxyethylene perfluoroalkyl ether (manufactured by DAIKIN INDUSTRIES, LTD., active ingredient: 100%)
* Proxel GXL: antifungal agent containing 1,2-benzisothiazolin-3-one as a main ingredient, manufactured by Avecia Biotechnology Inc., component: 20%, containing dipropyleneglycol)

—Ink Discharging Step (Printing Step)—

Under an environmental condition adjusted to 23±0.5° C. and 50±5% relative humidity (RH), an ink amount was set so that a uniform amount of ink adhered to the print medium by changing a drive voltage of a piezoelement so that an ink discharge rate was uniform, using an inkjet printer (IPSiO GXe-5500, manufactured by Ricoh Co., Ltd.).

Image Density

The prepared ink was charged into an inkjet printer (IPSiO GXe5500 manufactured by Ricoh Co., Ltd.), and a vinyl chloride medium NU-PVCM (manufactured by Panacea. co. ltd.) was previously coated with the pretreatment liquid using a bar coater at a wet adhesion rate of 3.2±0.5 g/m². Then, onto the dried vinyl chloride medium, a chart with 64-point JIS X 0208 (1997), 2223 general symbols prepared by Microsoft Word 2000 was printed in "Glossy paper—clean" mode (1200×1200 dpi) and "No color correction" mode, and dried using a dryer at 70° C. for 2 minutes.

JISX0208 (1997), 2223 is a symbol whose outer shape is a square and whose whole surface is filled with ink.

A density of the ink-filled portion was measured using a spectral colorimeter X-rite exact (manufactured by X-Rite Inc.), and judged based on the following criteria. A and B were within an acceptable range.

Evaluation Criteria
A: Black: 2.5 or higher
  Yellow: 1.2 or higher
  Magenta: 1.9 or higher
  Cyan: 2.3 or higher
B: Black: 2.2 or higher and lower than 2.5
  Yellow: 1.1 or higher and lower than 1.2
  Magenta: 1.75 or higher and lower than 1.9
  Cyan: 2.1 or higher and lower than 2.3
C: Black: 2.0 or higher and lower than 2.2
  Yellow: 1.0 or higher and lower than 1.1
  Magenta: 1.6 or higher and lower than 1.75
  Cyan: 1.9 or higher and lower than 2.1
D: Black: lower than 2.0
  Yellow: lower than 1.0
  Magenta: lower than 1.6
  Cyan: lower than 1.9

Beading

The ink described in each Example was printed as a solid image onto a vinyl chloride medium under the same pretreatment conditions and printing conditions as for the image density. Beading (density unevenness) on the solid image portion was observed, and judged based on the following evaluation criterion.

Evaluation Criteria
A: no density unevenness
B: slight density unevenness
C: medium density unevenness
D: great density unevenness Color Bleed The ink described in each Example was printed as a solid image onto a vinyl chloride medium under the same pretreatment conditions and printing conditions as for the image density. Because of evaluation of the color bleed, the ink for evaluation and an adjacent ink having a color other than the color of the ink for evaluation were simultaneously printed as solid images. For example, when the evaluation ink was black, a yellow ink was printed on the adjacent area, and when the evaluation ink was cyan, a magenta ink was printed on the adjacent area, to visually observe occurrence of color bleed (blur on color boundary).

Evaluation Criteria
A: no blur on color boundary
B: slight blur on color boundary
C: medium blur on color boundary
D: great blur on color boundary Ink Storage Stability Using the viscometer, a storage stability was calculated from a viscosity before storage and a viscosity measured after storage in a closed container at 60° C. for 7 days in accordance with the following equation, and evaluated based on the following evaluation criteria.

$$\text{Storage stability}(\%) = ([\text{viscosity after storage}]/[\text{viscosity before storage}]) \times 100$$

Evaluation Criteria
A: 100±5% or lower
B: higher than 100±5% and lower than 100±10%
C: 100±10% or higher Liquid Permeability Each ink was pressure-filtered using a cellulose acetate membrane filter having a pore size of 0.8 μm (28CP, manufactured by Advantec Toyo Kaisha, Ltd.) at an air pressure of 1 kgf/cm², and a liquid permeability of the ink composition was evaluated from an inclination (attenuation rate) obtained by collinearly approximating a decrease in a filtration rate with respect to a filtration permeation amount, and a maximum filtration rate.

Evaluation Criteria Liquid permeability: Good_A<----------->D_Poor

A: The attenuation rate is lower than $1.5 \times 10^{-3}$/sec, and the maximum filtration rate is 1.0 g/sec or higher
B: The attenuation rate is lower than $1.5 \times 10^{-3}$/sec, and the maximum filtration rate is lower than 1.0 g/sec.
C: The attenuation rate is $1.5 \times 10^{-3}$/sec or higher and lower than $2.5 \times 10^{-3}$/sec.
D: The attenuation rate is $2.5 \times 10^{-3}$/sec or higher Drying Property Using the image forming apparatus illustrated in FIG. 3, a chart with the same general symbols as for the image density was printed on OK top coat+manufactured by Oji Paper Co., Ltd at 104.7 g/m², and dried by applying hot air at 100° C. for 10 seconds in a drying step. Then, the dried image portion was visually observed to confirm whether the ink of the image portion adhered to a transfer roll, and evaluated based on the following criteria.

Evaluation Criteria
A: no transfer
B: slight transfer with no problem in practical use
C: medium transfer
D: great transfer Discharge Stability Evaluation of Continuous Dischargeability 1 L of each individually adjusted ink was passed through a discharge head of each color from an ink cartridge of an inkjet printer (IPSiO GXe-5500, manufactured by Ricoh Co., Ltd.). Immediately after that, 200 charts in which 80% of an area of A4 size paper was filled with a solid image prepared by Microsoft Word 2000 were continuously printed onto MyPaper (manufactured by Ricoh Co., Ltd.), after that, a nozzle check chart was printed, and discharge turbulence of each nozzle was evaluated based on the following criteria.

The printing mode was changed from a mode "plain paper—normal or fast" to a mode "no color correction" in the user setting for plain paper by a driver attached to the printer.

Evaluation Criteria

A: no discharge turbulence

B: slight discharge turbulence

C: medium discharge turbulence, or no discharge on some portions

D: great discharge turbulence, or no discharge on many nozzles

Fixity-1 Rubfastness

Under the same pretreatment conditions and printing conditions as for the image density, the ink described in each Example was printed as a solid image onto a vinyl chloride medium.

The solid image portion was rubbed with dry cotton (cannequin No. 3) by applying a load of 400 g, and rubfastness was judged based on the following criteria. A and B were within an acceptable range.

Evaluation Criteria

A: The image does not change even after rubbing 100 times or more.

B: Although some scratches remain after rubbing 100 times, the image density is not affected.

C: The image density decreases while rubbing 100 times.

D: The image density decreases by rubbing 50 times or less.

Fixity-2 Alcohol Resistance

Under the same pretreatment conditions and printing conditions as for the image density, the ink described in each Example was printed as a solid image onto a vinyl chloride medium. A cotton swab was impregnated with 0.5 mL of ethanol, the printed solid image portion was rubbed with the cotton swab reciprocatedly 10 times, then the image was visually observed, and evaluated based the following criteria.

Evaluation Criteria

A: The image portion has no change.

B: The image is readable but slightly scratched.

C: The image is readable but scratched.

D: The image portion is peeled off, and the recording medium portion can be visually recognized.

Table 5 presents the evaluation results.

Since the inks in Examples 1, 2, and 17 to 19 are clear inks, it is impossible to evaluate image density, color bleed, and beading. Thus, evaluation results of image density, color bleed, and beading are represented by "–".

TABLE 5

| | Ink | Temperature and time for warming ink | Amount of crystals containing the compound having the structure represented by genera formula (I) (ppm) | Presence of 10μ disposable filter between ink flow passages | Pretreatment liquid | Image density | Beading (color unevenness) | Color beeed (blur on color boundary) | Ink storage stability | liquid permeability | Drying property | Discharge stability (continuous discharge evaluation) | Fixity-1 Rubfast-ness | Fixity-2 Alcohol resistance |
|---|---|---|---|---|---|---|---|---|---|---|---|---|---|---|
| Example 1 | Ink 1 | 50° C., 2 weeks | 3.9 | None | Pretreatment liquid 2 | — | — | — | B | B | B | B | A | A |
| Example 2 | Ink 2 | 60° C., 48 hours | 1.8 | None | Pretreatment liquid 2 | A | A | A | B | A | B | A | A | A |
| Example 3 | Ink 3 | 65° C., 8 hours | 0.2 | None | Pretreatment liquid 1 | A | A | A | A | A | A | A | A | B |
| Example 4 | Ink 4 | 40° C., 1 month | 3.5 | None | Pretreatment liquid 3 | A | A | A | B | B | B | B | B | B |
| Example 5 | Ink 5 | 60° C., 24 hours | 1.1 | None | Pretreatment liquid 4 | B | A | A | B | A | B | A | A | A |
| Example 6 | Ink 6 | 55° C., 24 hours | 1.3 | None | Pretreatment liquid 5 | A | A | A | A | A | A | A | A | A |
| Example 7 | Ink 7 | 68° C., 6 hours | 0.4 | None | Pretreatment liquid 6 | B | A | A | A | A | A | A | A | A |
| Example 8 | Ink 8 | 45° C., 1 month | 3.7 | None | Pretreatment liquid 7 | A | B | B | A | A | B | B | A | B |
| Example 9 | Ink 9 | 65° C., 12 hours | 1.5 | None | Pretreatment liquid 8 | A | B | B | A | A | A | A | B | A |
| Example 10 | Ink 10 | 60° C., 24 hours | 0.4 | None | Pretreatment liquid 9 | A | A | A | A | A | A | A | A | A |
| Example 11 | Ink 11 | 60° C., 24 hours | 0.2 | None | Pretreatment liquid 10 | A | A | A | A | A | A | A | A | B |
| Example 12 | Ink 12 | 60° C., 24 hours | 0.2 | None | Pretreatment liquid 11 | A | A | A | B | A | A | A | A | A |
| Example 13 | Ink 13 | 60° C., 16 hours | 0.3 | None | Pretreatment liquid 4 | A | A | A | B | A | B | B | A | A |
| Example 14 | Ink 14 | 65° C., 12 hours | 1.2 | None | Pretreatment liquid 4 | A | A | A | A | A | A | A | A | A |
| Example 15 | Ink 15 | 60° C., 12 hours | 0.7 | None | Pretreatment liquid 4 | A | A | A | A | A | A | A | A | A |
| Example 16 | Ink 16 | 60° C., 16 hours | 0.5 | None | Pretreatment liquid 4 | B | B | B | B | B | B | B | A | A |
| Example 17 | Ink 17 | 50° C., 36 hours | 3.8 | None | Pretreatment liquid 4 | A | A | A | B | A | A | A | A | B |
| Example 18 | Ink 17 | 50° C., 36 hours | 3.8 | Yes | Pretreatment liquid 4 | A | A | A | A | A | A | A | A | A |
| Example 19 | Ink 1 | 50° C., 2 weeks | 3.7 | Yes | Pretreatment liquid 4 | A | A | A | A | A | A | A | A | A |
| Comparative Example 1 | Pre-ink 1 | None | 14.5 | None | Pretreatment liquid 2 | B | D | B | D | C | A | C | A | A |
| Comparative Example 2 | Pre-ink 2 | None | 5.4 | None | Pretreatment liquid 2 | A | A | A | A | C | A | C | A | A |
| Comparative Example 3 | Pre-ink 3 | None | 4.6 | None | Pretreatment liquid 1 | A | A | A | A | C | A | C | B | B |
| Comparative Example 4 | Pre-ink 4 | None | 6.1 | None | Pretreatment liquid 3 | A | A | A | A | D | B | D | A | B |
| Comparative Example 5 | Pre-ink 5 | None | 6.3 | None | Pretreatment liquid 4 | A | A | A | A | D | B | D | A | D |
| Comparative Example 6 | Pre-ink 5 | None | 6.2 | None | Pretreatment liquid 5 | B | A | A | A | C | B | C | A | A |
| Comparative Example 7 | Pre-ink 7 | None | 6.4 | None | Pretreatment liquid 6 | B | A | A | A | D | B | D | A | A |
| Comparative Example 8 | Pre-ink 8 | None | 6.9 | None | Pretreatment liquid 7 | A | B | B | A | C | B | D | B | B |
| Comparative Example 9 | Pre-ink 9 | None | 5.3 | None | Pretreatment liquid 8 | A | B | B | A | C | A | C | A | A |
| Comparative Example 10 | Pre-Ink 10 | None | 4.2 | None | Pretreatment liquid 9 | A | A | A | A | A | A | A | A | A |
| Comparative Example 11 | Pre-ink 11 | None | 4.8 | None | Pretreatment liquid 10 | A | A | A | A | D | B | D | A | B |
| Comparative Example 12 | Pre-ink 12 | None | 6.9 | None | Pretreatment liquid 11 | A | B | B | B | D | B | D | B | D |
| Comparative Example 13 | Pre-ink 13 | None | 8.5 | None | Pretreatment liquid 4 | A | A | A | A | A | A | C | A | A |
| Comparative Example 14 | Pre-ink 14 | None | 6.8 | None | Pretreatment liquid 4 | A | B | B | B | C | A | C | A | A |
| Comparative Example 15 | Pre-ink 15 | None | 5.3 | None | Pretreatment liquid 4 | B | B | B | B | D | B | D | B | D |
| Comparative Example 16 | Pre-ink 16 | None | 0 | None | Pretreatment liquid 4 | A | A | A | A | C | A | C | A | A |
| Comparative Example 17 | Ink 18 | 38° C., 1 month | 6.5 | None | Pretreatment liquid 4 | A | A | A | A | C | A | C | A | A |
| Comparative Example 18 | Pre-ink 12 | None | 7.9 | Yes | Pretreatment liquid 4 | A | A | A | A | D | A | C | A | D |
| Comparative Example 19 | Pre-ink 13 | None | 8.5 | Yes | Pretreatment liquid 4 | A | A | A | A | D | A | C | A | A |

TABLE 5-continued

| Ink | Temperature and time for warming ink | Amount of crystals containing the compound having the structure represented by general formula (I) (ppm) | Presence of 10μ disposable filter between ink flow passages | Pretreatment liquid | Image density | Beading (color unevenness) | Color beeed (blur on color boundary) | Ink storage stability | liquid permeability | Drying property | Discharge stability (continuous discharge evaluation) | Fixity-1 Rubfastness | Fixity-2 Alcohol resistance |
|---|---|---|---|---|---|---|---|---|---|---|---|---|---|---|
| Comparative Example 20 | Ink 5 | 60° C., 24 hours | 1.1 | None | Pretreatment liquid 12 | B | D | D | B | A | A | A | A | A |
| Comparative Example 21 | Ink 5 | 60° C., 24 hours | 1.1 | None | None | B | D | D | B | A | A | A | B | A |

* 10 μm disposable filter (ACRO 25 LCF F-12100, manufactured by Pall Corporation) was used.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A method for printing, comprising:
applying a pretreatment liquid containing a compound that aggregates an anionic compound on a print medium; and
applying an ink containing water, an organic solvent, and a resin particle on the print medium to which the pretreatment liquid has been applied,
wherein the resin particle includes a polyurethane resin particle comprising a polyurethane resin having a structure represented by the general formula (I):

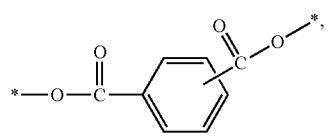

general formula (I)

wherein after the ink is left to stand and stored under a room temperature environment (25±5° C.) for a month, a rate of content of crystals of the cyclic ester having a particle diameter of 1 μm or larger in the ink is lower than 4 ppm.

2. The method for printing according to claim 1, wherein the ink further contains a colorant.

3. The method for printing according to claim 2, wherein a rate of solid content of the polyurethane resin particle in the ink is 3% by mass or higher, and a solid content mass ratio between the colorant and the polyurethane resin particle is 1.0:(2.0 to 11.0).

4. The method for printing according to claim 2, wherein the colorant comprises a pigment.

5. The method for printing according to claim 1, wherein the organic solvent comprises at least one of a diol compound and an organic solvent having a solubility parameter (SP value) of 8.9 to 12.0.

6. The method for printing according to claim 1, Therein the ink has a pH of 8.5 or higher.

7. The method for printing according to claim 1, wherein the pretreatment liquid further contains a nonionic resin particle.

8. The method for printing according to claim 7, wherein the nonionic resin particle comprises at least one resin selected from the group consisting of a polyolefin resin, a polyvinyl acetate resin, a polyvinyl chloride resin, a styrene-butadiene resin, and a copolymer of any of these resins.

9. The method for printing according to claim 1, wherein the compound that aggregates the anionic compound is a cationic compound selected from the group consisting of an inorganic metal salt, an organic acid metal salt, and an organic acid ammonium salt.

10. The method for printing according to claim 1, wherein the pretreatment liquid further contains water and an organic solvent.

11. The method for printing according to claim 1, further comprising:
heat-drying the print medium after the applying the ink.

12. The method for printing according to claim 1, wherein the applying the pretreatment liquid includes discharging the pretreatment liquid onto the print medium using a discharge head.

13. The method for printing according to claim 1, wherein the applying the pretreatment liquid includes applying the pretreatment liquid on the print medium using a coating roller.

14. The method for printing according to claim 1, wherein the polyurethane resin is obtained by synthesis from a polyol.

15. The method for printing according to claim 14, wherein the polyol contains the structure of general formula (I).

16. The method for printing according to claim 1, wherein after the ink is left to stand and stored under a room temperature environment (25±5° C.) for a month, the rate of content of crystals of the cyclic ester having a particle diameter of 1 μm or larger in the ink is from 0.2 ppm to 3.9 ppm.

17. A printer comprising:
a pretreatment liquid-applying mechanism configured to apply a pretreatment liquid containing a compound that aggregates an anionic compound on a print medium; and
an ink applying-mechanism configured to apply an ink containing water, an organic solvent, and a resin particle on the print medium to which the pretreatment liquid has been applied,
wherein the resin particle includes a polyurethane resin particle comprising a polyurethane resin having a structure represented by the general formula (I):

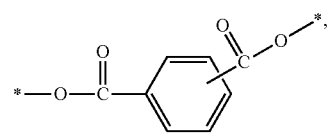

general formula (I)

wherein the ink contains a cyclic ester having a structure represented by general formula (I), and after the ink is left to stand and stored under a room temperature environment (25±5° C.) for a month, a rate of content of crystals of the cyclic ester having a particle diameter of 1 μm or larger in the ink is lower than 4 ppm.

* * * * *